(12) United States Patent
Ryu et al.

(10) Patent No.: US 10,531,431 B2
(45) Date of Patent: Jan. 7, 2020

(54) APPARATUS AND METHOD FOR ALLOCATING RESOURCES IN DEVICE-TO-DEVICE COMMUNICATION IN WIRELESS NETWORK

(71) Applicant: Samsung Electronics Co., Ltd., Suwon-si, Gyeonggi-do (KR)

(72) Inventors: Hyun-Seok Ryu, Yongin-si (KR); Seung-Hoon Park, Seoul (KR); Chi-Woo Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 410 days.

(21) Appl. No.: 14/322,214

(22) Filed: Jul. 2, 2014

(65) Prior Publication Data
US 2015/0009910 A1    Jan. 8, 2015

(30) Foreign Application Priority Data

Jul. 2, 2013  (KR) .......................... 10-2013-0076800
May 9, 2014  (KR) .......................... 10-2014-0055729

(51) Int. Cl.
| | | |
|---|---|---|
| H04W 72/04 | (2009.01) | |
| H04W 72/12 | (2009.01) | |
| H04W 8/00 | (2009.01) | |
| H04W 72/08 | (2009.01) | |
| H04W 76/14 | (2018.01) | |

(52) U.S. Cl.
CPC ........... *H04W 72/04* (2013.01); *H04W 72/12* (2013.01); *H04W 8/005* (2013.01); *H04W 72/08* (2013.01); *H04W 76/14* (2018.02)

(58) Field of Classification Search
None
See application file for complete search history.

(56) References Cited

U.S. PATENT DOCUMENTS

| | | | |
|---|---|---|---|
| 2006/0095349 A1* | 5/2006 | Morgan ................... | G01S 5/02 705/29 |
| 2008/0080552 A1* | 4/2008 | Gates ...................... | H04L 12/66 370/468 |
| 2008/0232284 A1* | 9/2008 | Dalsgaard ........... | H04W 72/042 370/310 |
| 2009/0010185 A1 | 1/2009 | Li et al. | |
| 2009/0016225 A1 | 1/2009 | Laroia et al. | |
| 2009/0135721 A1* | 5/2009 | Karlsson ............... | H04W 72/10 370/235 |

(Continued)

FOREIGN PATENT DOCUMENTS

| | | |
|---|---|---|
| KR | 10-2011-0007931 A | 1/2011 |
| WO | 2012/159270 A1 | 11/2012 |
| WO | 2013/077684 A1 | 5/2013 |

*Primary Examiner* — Jeffrey M Rutkowski
*Assistant Examiner* — Andre Tacdiran
(74) *Attorney, Agent, or Firm* — Jefferson IP Law, LLP

(57) ABSTRACT

A method for allocating resources in Device-to-Device (D2D) communication in a wireless network is provided. The method includes requesting, by a device, resource allocation from an enhanced Node B (eNB) and causing the device to be allocated, from the eNB, a Resource Block (RB) for transmitting one of D2D discovery and communication data and control information. The RB includes information about a location of the resource-allocated time or frequency.

28 Claims, 14 Drawing Sheets

(56) References Cited

U.S. PATENT DOCUMENTS

| | | | |
|---|---|---|---|
| 2009/0213821 A1* | 8/2009 | Fonseca, Jr. | H04W 52/0225 370/338 |
| 2009/0303951 A1* | 12/2009 | Lunttila | H04L 1/0026 370/329 |
| 2009/0323647 A1 | 12/2009 | Park et al. | |
| 2009/0325601 A1 | 12/2009 | Park et al. | |
| 2010/0272029 A1 | 10/2010 | Laroia et al. | |
| 2011/0066738 A1* | 3/2011 | Richardson | H04W 72/02 709/229 |
| 2011/0205981 A1* | 8/2011 | Koo | H04L 1/1671 370/329 |
| 2011/0294529 A1* | 12/2011 | Luo | H04L 5/0048 455/509 |
| 2012/0051315 A1* | 3/2012 | Wang | H04W 72/082 370/329 |
| 2012/0106499 A1 | 5/2012 | Seo et al. | |
| 2012/0315859 A1* | 12/2012 | Lee, II | H04J 11/005 455/67.13 |
| 2013/0064175 A1* | 3/2013 | Pandey | H04W 8/005 370/328 |
| 2013/0121260 A1* | 5/2013 | Mukherjee | H04W 72/0466 370/329 |
| 2013/0155872 A1 | 6/2013 | Subramanian et al. | |
| 2013/0250771 A1* | 9/2013 | Yu | H04W 76/14 370/241 |
| 2013/0322413 A1* | 12/2013 | Pelletier | H04W 72/1289 370/336 |
| 2014/0036801 A1* | 2/2014 | Malladi | H04J 11/0023 370/329 |
| 2014/0056220 A1* | 2/2014 | Poitau | H04W 40/246 370/328 |
| 2014/0086152 A1* | 3/2014 | Bontu | H04L 1/1812 370/329 |
| 2014/0094183 A1* | 4/2014 | Gao | H04W 72/048 455/450 |
| 2014/0119357 A1* | 5/2014 | Abraham | H04W 56/001 370/338 |
| 2014/0126386 A1* | 5/2014 | Beale | H04L 5/0069 370/252 |
| 2014/0141824 A1* | 5/2014 | Kim | H04W 88/06 455/501 |
| 2014/0141825 A1* | 5/2014 | Koo | H04W 48/08 455/501 |
| 2014/0269658 A1* | 9/2014 | Sadasivam | H04W 72/0406 370/338 |
| 2014/0273861 A1* | 9/2014 | Abdelmonem | H04L 5/0026 455/63.1 |
| 2014/0286286 A1* | 9/2014 | Yamazaki | H04W 56/00 370/329 |
| 2014/0286293 A1 | 9/2014 | Jang et al. | |
| 2014/0295882 A1* | 10/2014 | Guo | G01S 5/02 455/456.1 |
| 2015/0208453 A1* | 7/2015 | Yamazaki | H04W 76/14 370/329 |
| 2015/0319742 A1* | 11/2015 | Koivisto | H04W 72/0406 370/329 |
| 2015/0319796 A1* | 11/2015 | Lu | H04B 7/2615 370/330 |
| 2016/0112977 A1* | 4/2016 | Byun | H04W 56/0015 370/350 |
| 2016/0143052 A1* | 5/2016 | Yilmaz | H04W 72/1263 370/329 |
| 2016/0337873 A1* | 11/2016 | Zhou | H04W 36/0061 |
| 2017/0093479 A1* | 3/2017 | Mogi | H04B 7/155 |

\* cited by examiner

APPARATUS AND METHOD FOR ALLOCATING RESOURCES IN DEVICE-TO-DEVICE COMMUNICATION IN WIRELESS NETWORK

CROSS-REFERENCE TO RELATED APPLICATION(S)

This application claims the benefit under 35 U.S.C. § 119(a) of a Korean patent application filed on Jul. 2, 2013 in the Korean Intellectual Property and assigned Serial number 10-2013-0076800, and of a Korean patent application filed on May 9, 2014 in the Korean Intellectual Property Office and assigned Serial number 10-2014-0055729, the entire disclosure of each of which is hereby incorporated by reference.

TECHNICAL FIELD

The present disclosure relates to a wireless network. More particularly, the present disclosure relates to an apparatus and method for allocating resources in Device-to-Device (D2D) communication.

BACKGROUND

Recently, along with the prevalence of wireless devices supporting wireless data communication such as smart phones, the efficient utilization of wireless resources has become a technical and social issue. Among the technologies developed to meet demand, Device-to-Device (D2D) communication that enables direct communication between wireless devices in a network without an enhanced Node B (eNB) (or a Base Station (BS)) has attracted significant attention.

D2D communication performed within the wireless network may not only increase the efficiency of wireless resources, but also reduce power consumption of the devices and network and expand the service coverage of the wireless network. In addition, D2D communication may efficiently distribute the load of the eNB, which is caused by its support of mass content, using the proximity between devices.

D2D communication, one of various communication methods including Mobile-to-Mobile (M2M) communication, Machine-to-Machine (M2M) communication, Terminal-to-Terminal (T2T) communication and Peer-to-Peer (P2P) communication, may be widely used in physical application thereof.

Based on the D2D communication, a device (or terminal) needs to transmit a discovery signal for discovering its nearby device, and a resource allocation method supporting this should be provided.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for allocating resources for Device-to-Device (D2D) discovery by an enhanced Node B (eNB) in response to a resource request from D2D devices.

Another aspect of the present disclosure is to provide an apparatus and method for allocating resources in D2D communication in a wireless network, to minimize an increase in overhead during resource allocation.

Another aspect of the present disclosure is to provide an apparatus and method for allocating resources in D2D communication in a wireless network, to control a priority of Resource Block (RB) selection for transmitting a discovery signal if there is a priority in discovery.

Another aspect of the present disclosure is to provide an apparatus and method for allocating resources in D2D communication in a wireless network, to allocate resources for efficient use of the resources.

Another aspect of the present disclosure is to provide an apparatus and method for allocating resources in D2D communication in a wireless network, in which upon receiving a resource allocation request from a device, an eNB may allocate, to the device, resources for transmitting discovery information or resources for transmitting data and control information for D2D communication, using persistent resource allocation, semi-persistent resource allocation or dynamic resource allocation.

In accordance with an aspect of the present disclosure, a method for allocating resources in D2D communication in a wireless network is provided. The method includes requesting, by a device, resource allocation from an eNB, and causing the device to be allocated, from the eNB, an RB for transmitting one of D2D discovery and communication data and control information. The RB may include information about a location of the resource-allocated time or frequency.

In accordance with another aspect of the present disclosure, a method for allocating resources in D2D communication in a wireless network is provided. The method includes receiving, by an eNB, a resource allocation request from a device and allocating, to the device, a RB for transmitting one of D2D discovery and communication data and control information. The RB may include information about a location of the resource-allocated time or frequency.

In accordance with another aspect of the present disclosure an apparatus configured to allocate resources in D2D communication in a wireless network is provided. The apparatus includes a controller configured to request resource allocation from an eNB, and to cause the apparatus to be allocated, from the eNB, a RB for transmitting one of D2D discovery and communication data and control information. The RB may include information about a location of the resource-allocated time or frequency.

In accordance with another aspect of the present disclosure, an apparatus configured to allocate resources in D2D communication in a wireless network is provided. The apparatus includes a controller configured to receive, a resource allocation request from a device, and to allocate, to the device, a RB for transmitting one of D2D discovery and communication data and control information. The RB may include information about a location of the resource-allocated time or frequency.

In accordance with another aspect of the present disclosure, a method for requesting resource allocation in D2D communication in a wireless network is provided. The method includes obtaining, by a device, information about an RB through a received System Information Block (SIB), scanning an energy level for the RB, determining whether the scanning results satisfy a predetermined condition, and requesting resource allocation from an eNB if the scanning results satisfy the predetermined condition.

In accordance with another aspect of the present disclosure, a method for requesting resource allocation in D2D communication in a wireless network is provided. The method includes setting, by an eNB, information about an RB in an SIB, transmitting the set SIB to a device, and receiving a dynamic resource allocation request from the device if a predetermined condition is satisfied. The device may obtain information about an RB through an SIB, scan an energy level for the RB, determine whether the scanning results satisfy a predetermined condition, and request dynamic resource allocation from the eNB if the scanning results satisfy the predetermined condition.

In accordance with still another aspect of the present disclosure, an apparatus configured to request resource allocation in D2D communication in a wireless network is provided. The apparatus includes a controller configured to obtain information about a RB through a SIB, to scan an energy level for the RB, determine whether the scanning results satisfy a predetermined condition, and to request dynamic resource allocation from an eNB if the scanning results satisfy the predetermined condition.

In accordance with still another aspect of the present disclosure, an apparatus configured to request resource allocation in D2D communication in a wireless network is provided. The apparatus includes a controller configured to set information about a RB in a SIB, to transmit the set SIB to a device, and to receive a dynamic resource allocation request from the device if a predetermined condition is satisfied. The device may obtain information about an RB through an SIB, scan an energy level for the RB, determine whether the scanning results satisfy a predetermined condition, and request dynamic resource allocation from the eNB if the scanning results satisfy the predetermined condition.

In accordance with another aspect of the present disclosure, a method for allocating resources in D2D communication in a wireless network is provided. The method includes transmitting, by a device, a resource allocation request to an eNB, receiving a Physical Downlink Control CHannel (PDCCH) from the eNB, obtaining RB information for transmitting one of D2D discovery and communication data and control information over the PDCCH, and transmitting data using resources corresponding to the RB information.

In accordance with another aspect of the present disclosure, a method for allocating resources in D2D communication in a wireless network is provided. The method includes receiving, by an eNB, a resource allocation request from a device, transmitting a PDCCH to the device, and receiving data using resources corresponding to RB information for transmitting one of D2D discovery and communication data and control information, which are included in the PDCCH.

In accordance with another aspect of the present disclosure an apparatus configured to allocate resources in D2D communication in a wireless network is provided. The apparatus includes a receiver configured to receive a resource allocation request from a device and a transmitter configured to transmit a PDCCH to the device. The receiver is configured to receive data using resources corresponding to RB information for transmitting one of D2D discovery and communication data and control information, which are included in the PDCCH.

In accordance with another aspect of the present disclosure, an apparatus configured to allocate resources in D2D communication in a wireless network is provided. The apparatus includes a receiver configured to receive a resource allocation request from a device and a transmitter configured to transmit a PDCCH to the device. The receiver is configured to receive data in resources corresponding to RB information, and the PDCCH includes RB information for transmitting one of D2D discovery and communication data and control information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
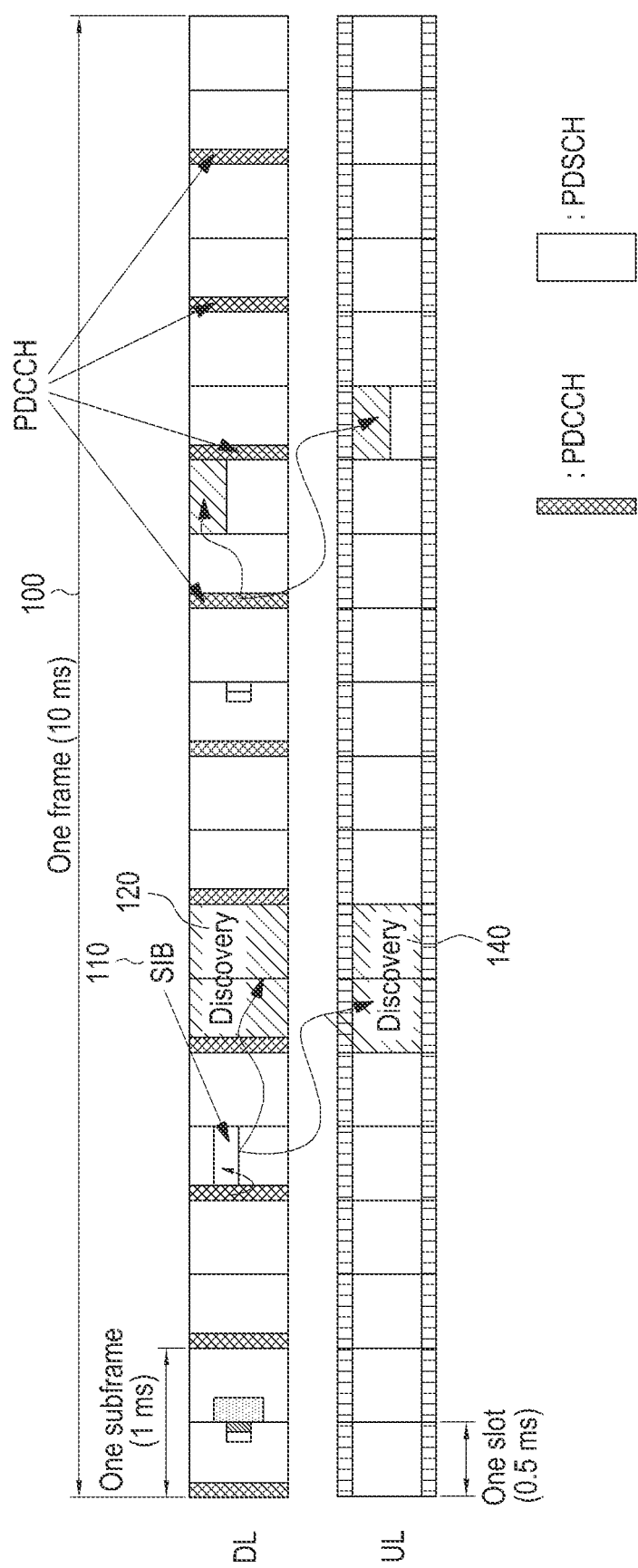
FIG. 1 illustrates an example of a frame structure for a static allocation method and a dynamic allocation method in an Long Term Evolution (LTE) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skilled in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In an embodiment of the present disclosure, a wireless network supporting Device-to-Device (D2D) communication will be assumed as a D2D network. However, the technical configuration according to embodiments of the present disclosure should not be interpreted as being limited to the D2D network. In other words, it will be apparent to those of ordinary skill in the art that the technical configuration according to embodiments of the present disclosure may be equally applied to the wireless network or cellular system supporting D2D communication. According to an embodiment of the present disclosure, a transmitting device may drive a selected application based on its D2D communication with at least one receiving device in the wireless network. The transmitting device may transmit discovery signal or discovery information to discover at least one receiving device, to which the transmitting device will form a D2D communication link. This may include a series of processes in which the transmitting device notifies other nearby devices of its identity and interest. The identity and interest may be a device IDentifier (ID), an application ID, a service ID or the like, and they may be configured in various ways depending on the D2D service and operational scenario.

Although not illustrated in the drawings, the hierarchical structure of a D2D device will be assumed to include a D2D application layer, a D2D management layer and a D2D transport layer. The D2D application layer means a D2D service application program that is driven in the device's Operating System (OS). The D2D management layer is responsible for a function of converting the discovery information generated in the D2D application program into a format suitable for the D2D transport layer. The D2D transport layer is a PHYsical (PHY)/Media Access Control (MAC) layer of the Long Term Evolution (LTE) or Wireless Fidelity (Wi-Fi) wireless communication standard. The D2D discovery may have the following procedure. If a user executes a D2D application program, information for discovery may be generated in the D2D application layer, and delivered to the D2D management layer. The D2D management layer may convert the discovery information received from the D2D application layer into a management layer message. The management layer message may be transmitted via the D2D transport layer of the device. Upon receiving the management layer message, devices may perform a reception operation in reverse order of the transmission process.

D2D communication is a communication method in which devices may directly exchange traffic with each other without infrastructure such as an enhanced eNB, an Access Point (AP) or the like. In D2D communication, after a D2D discovery process is performed, communication may be performed based on the results (e.g., between the discovered devices), or communication may be performed between devices even without the D2D discovery process. Whether the D2D discovery process is needed prior to D2D communication may be determined depending on the D2D service and operational scenario.

D2D services may be roughly classified into commercial services (or non-public safety services) and public safety services. Each service may include many examples, including advertisement, Social Network Service (SNS), game, public safety service, and the like.

1) Advertisement

A communication network operator supporting D2D may allow the pre-registered stores, cafes, cinemas, restaurants and the like to advertise their own identity to the nearby D2D users, using D2D discovery or D2D communication. The interest may be promotion information, event information, discount coupons or the like of the advertisers. Among the D2D users, users interested in issuing discount coupons for certain goods may upload their interests to a D2D server. If the identity that the D2D users have received is coincident with the interest of the users, the users may visit the store and obtain more information using the existing cellular communication or D2D communication. As another example, an individual user may discover his/her nearby taxi through D2D discovery, and exchange information about his/her destination, taxi rates or the like with the taxi through the existing cellular communication or D2D communication.

2) Social Network Service (SNS)

A user may transmit his/her application and the interest in the application to other nearby users. The identity or interest used for D2D discovery may be the application's friend list or the application ID. After undergoing D2D discovery, the user may share his/her content such as photos, videos or the like with the nearby users through D2D communication.

3) Game

In order to enjoy a mobile game with nearby users, a user may discover the users and game application through a D2D discovery process, and perform D2D communication for transmission of the data needed for the game.

4) Public Safety Service

Police officers, firefighters, and the like may use the D2D communication technology for the purpose of public safety. If cellular communication is impossible because the existing cellular network is partially damaged due to emergency situations such as fires, landslides or the like, or natural disasters such as earthquakes, volcanic eruptions, tsunamis or the like, the police officers and firefighters may discover nearby colleagues or share their emergency information with nearby users through the D2D communication technology.

A D2D device to be described herein may include at least one of a transmitting device and a receiving device. According to embodiments of the present disclosure, a cellular mode device (or a cellular device) and a D2D device may be separately described. The cellular device may refer to a device that communicates with the eNB or other devices using the conventional cellular communication network without the D2D link, and the D2D device may refer to a device that performs D2D discovery or D2D communication through the D2D link. The D2D device may perform communication with the eNB, for transmission and reception of various control information. The term 'device' is used without special distinction in this specification, and may be construed to refer to not only the D2D device but also the cellular device.

In a device according to embodiments of the present invention, only discovery may be separately performed without communication; only communication may be separately performed without discovery; and discovery and communication may be performed in conjunction (e.g., communication may be performed after the discovery).

Resource allocation methods for transmitting a discovery signal may be roughly classified into two methods.

A first method is a static/semi-static resource allocation method.

During static/semi-static resource allocation, the eNB may allocate resources through a System Information Block (SIB) that the eNB transmits in a downlink frame. For example, the eNB may transmit resource allocation information for a D2D discovery signal over a Physical Downlink Control Channel (PDCCH) by scrambling the resource allocation information with a System Information-Radio Network Temporary Identifier (SI-RNTI), or with a D2D Radio Network Temporary Identifier (D2D-RNTI) that all D2D devices existing in the eNB use in common. The presence/absence of an SIB may be indicated by the transmission of the PDCCH that is expressed with the SI-RNTI (or D2D-RNTI). All devices in the cell may know the SI-RNTI (or D2D-RNTI) in advance, and obtain resource allocation information of an SIB from the PDCCH using the SI-RNTI (or D2D-RNTI). The SIB shown in may be transmitted over a Physical Downlink Shared Channel (PDSCH). In other words, the device may obtain resource allocation information of an SIB allocated to the PDSCH, from the PDCCH, decode the SIB, and then finally obtain resource allocation information for transmission of a D2D discovery signal. The SIB may include resource pool information for a D2D receiving device and resource pool information for a D2D transmitting device. The resource pool information may include a time-axis resource pool (e.g., the number of subframes) where D2D discovery or D2D communication may be used, and information (e.g., the number of Resource Blocks (RBs) that can be used for D2D in a subframe) about a period of the time-axis resource pool and about a frequency-axis resource pool. If resources for D2D discovery signal transmission or D2D communication are allocated using the static/semi-static resource allocation method, devices desiring D2D transmission may select resources (e.g., RBs) for D2D transmission within the allocated resource pool in a distributed way. D2D devices may select RBs for D2D transmission in a greedy way in accordance with the following procedure.

1) The D2D devices may measure energy levels of all RBs within the period during a predefined peer discovery period.

2) The D2D devices may select an RB having the lowest energy level from the measured RBs and transmit peer discovery information on the selected RB, or may randomly select one of the RBs whose energy levels are lower than or equal to the bottom x % (e.g., 5%) and transmit peer discovery information on the selected RB.

The D2D devices may select resources in a random way in addition to the greedy way. In other words, the D2D devices may perform D2D transmission by randomly selecting one RB within a D2D transmission resource pool.

A second method is a dynamic resource allocation method.

During dynamic resource allocation, the eNB may use the same method as the method in which the eNB allocates DownLink (DL) resources and UpLink (UL) resources for devices in the existing LTE system. The eNB may allocate downlink resources or uplink resources to the devices that desire to transmit D2D signals over the PDCCH that the eNB transmits in a downlink frame. In the existing LTE system, resource allocation for a downlink means resources that a device should receive, and resource allocation for an uplink means resources that a device should transmit.

However, in the D2D communication scheme, when allocating downlink resources for transmission of a D2D signal, the eNB should set transmitting devices that transmit the D2D signal, so as to transmit the D2D signal in the allocated downlink resources, and set receiving devices that receive the D2D signal, so as to receive the D2D signal in the allocated downlink resources. For this operation, an operation should be supported in which, in the downlink, a D2D transmitting device transmits the D2D signal and a D2D receiving device receives the D2D signal.

Further, when allocating uplink resources for transmission of a D2D signal, the eNB should set transmitting devices that transmit the D2D signal, so as to transmit the D2D signal in the allocated uplink resources, and set receiving devices that receive the D2D signal, so as to receive the D2D signal in the allocated uplink resources. For this operation, an operation should be supported in which, in the uplink, a D2D transmitting device transmits the D2D signal and a D2D receiving device receives the D2D signal.

In the general resource allocation method, the eNB may allocate D2D resources using the static resource allocation method, and a device that desires to transmit a discovery signal in the allocated D2D resources may select an RB that the device desires to use, in a greedy way or a random way. In this static resource allocation method, the greedy (or random resource selection) scheme may have difficulty in congestion control or load balancing. In a case where a device desiring to transmit a discovery signal in a greedy way has scanned energy levels, if energy levels of most RBs are high and similar to each other, congestion may occur, but there is no way to solve this problem. In another method, a device performs random back-off on its own. Basically, however, the discovery period may be long in the static resource allocation method. Therefore, as in the real-time service, if the delay requirement is the important measure that influences the system performance (e.g., if the discovery should be performed quickly), there is no way to solve this problem. Further, if there is a priority in discovery, then there is no way to control a priority of RB selection. In the random resource selection scheme, a D2D transmitting device may randomly select D2D transmission resources that the D2D transmitting device will use, without any prior information. Therefore, as in the greedy scheme, if there is a priority in congestion control, load balancing, and discovery, then there is no way to control a priority of RB selection.

When allocating resources to devices in the cellular system according to the related art, the eNB may perform resource allocation using a semi-persistent allocation method, a persistent allocation method or a dynamic allocation method. However, the control signaling that was performed for resource allocation in the existing cellular system may not be applied intact to D2D discovery, because no link has been formed between D2D devices during D2D discovery. Further, D2D communication that is now considered in LTE Rel-12 supports only the multicast/broadcast communication in which feedback by Layer 1/Layer 2 (L1/L2) is impossible, so the resource allocation and signaling in which the eNB receives feedback from a device and perform resource allocation in the existing cellular system may not be applied intact to D2D communication. Therefore, an additional control signaling way is needed for resource allocation in D2D discovery/communication, and when this control signaling is designed, an increase in additional overhead should be minimized.

Embodiments of the present disclosure relate to a resource allocation method and apparatus for transmission of a D2D signal, and may include conditions (e.g., congestion, delay requirement, and priority) on which a device requests resource allocation from the eNB, a method in which the device requests resource allocation from the eNB, and a method in which the eNB allocates discovery resources in response to the request.

A D2D device may obtain resource allocation information for D2D transmission and reception through an SIB. The eNB may transmit resource allocation information to the D2D devices existing in the cell, through an SIB. The resource allocation information may indicate the subframe or the subframe interval, at or in which resources are allocated for D2D transmission/reception, the period at which the subframes are allocated, and the number of RBs which are allocated as D2D resources in a subframe. As for an RB through which each D2D device will transmit discovery information, D2D data, and control information (e.g., Scheduling Assignment (SA)) in the D2D subframe, a D2D transmitting device may determine the RB on its own within the D2D resource pool that the D2D transmitting device is allocated from the eNB through an SIB, in accordance with the general resource allocation method (e.g., greedy method or random resource selection method), or the eNB may determine a transmission RB and allocate the RB to the D2D transmitting device. When allocating an RB for D2D transmission to a device, the eNB may allocate an RB to a specific D2D device by dynamically changing the time or frequency location of resources to be allocated, in every subframe. The eNB may allocate, to a specific D2D device, an RB having the same time or frequency location in consecutive subframes (persistent or semi-persistent resource allocation). On the other hand, in a case where the eNB allocates a specific subframe through an SIB, for D2D discovery or communication, a device (e.g., a discovery receiving device) that does not transmit discovery information or a device receiving D2D communication should receive (or decode) the discovery information or the data and control information for communication, which is transmitted in the D2D subframe.

1) Conditions on which Device Requests D2D Resource Allocation from eNB

Devices desiring to transmit discovery information or communication data and control information may request D2D resource allocation from the eNB due to the following reasons.

When a device determines an RB in which the device will transmit discovery information, in accordance with the above-described general resource allocation method, the D2D device may request resource allocation from the eNB, in consideration of the congestion or load balancing. D2D devices may request resource allocation from the eNB, if:

(i) energy levels of all RBs are higher than a specific threshold, (ii) no RB has an energy level lower than a specific threshold, (iii) an RB has am energy level lower than a specific threshold but there is little margin between the energy level of the RB and the threshold, or (iv) the number of RBs having energy levels lower than a specific threshold is less than or equal to a predetermined number.

When a device determines an RB in which the device will transmit discovery information, in accordance with the above-described general resource allocation method, in a process where the D2D devices whose priorities (e.g., priorities depending on the delay requirement) are higher than or equal to a specific value participate in discovery, the D2D devices may request resource allocation from the eNB if energy levels of all RBs are higher than a specific threshold. The priority (delay requirement class) information may be obtained through a logical entity (e.g., a priority handler, a delay requirement handler, or the like) existing in the network, when a D2D device initially enters the network or an application of a D2D device is turned on or executed. The logical entity may be separately located in a D2D server or an application server, or may be located in a Mobility Management Entity (MME), a Serving Gateway (S-Gateway), a Packet Data Network Gateway (P-Gateway), or the like.

When a device determines an RB in which the device will transmit discovery information, in accordance with the above-described general resource allocation method, the device may request additional resource allocation from the eNB by increasing the amount of discovery information. For example, in a process where D2D devices whose priority (delay requirement class) is greater than or equal to 3 participate in discovery, additional resource allocation may be required, because there is a change in the amount of discovery information though energy levels of all RBs are not higher than a specific threshold.

If the eNB does not support the above-described general resource allocation, a device desiring to transmit D2D discovery or communication data and control information may request resource allocation from the eNB, and the eNB may allocate an RB for transmitting the D2D discovery or communication data and control information, to the device. When allocating an RB for transmitting the D2D discovery or communication data and control information to the device, the eNB may allocate the RB to a specific D2D device by dynamically changing the time or frequency location of resources, in every subframe. The eNB may allocate, to a specific D2D device, an RB having the same time or frequency location in consecutive subframes (persistent or semi-persistent resource allocation). The device may request the D2D transmission resources that the device will use from the eNB depending on payload size of the D2D transmission resources (e.g., the size of the discovery information, and the size of the communication data and control information).

2) Method in which Device Requests Resource Allocation from eNB

A device may request resource allocation via one of the following three methods.

First, the device may transmit a D2D Resource Allocation Request (DRAR) to the eNB.

Second, the device may transmit a D2D Buffer Status Report (DBSR) to the eNB.

Third, the device may report, to the eNB, indexes of RBs that the device has selected.

DRAR: DRAR is similar to a Scheduling Request (SR) by which a device requests resource allocation from the eNB in the existing LTE-A. In LTE-A, an SR is 1-bit information, and may be transmitted over a Physical Uplink Control CHannel (PUCCH), which is an uplink control channel. More specifically, PUCCH format 1 (only SR), PUCCH format 1a (transmission of 1-bit HARQ ACK/NACK and SR), and PUCCH format 1b (transmission of 2-bit HARQ ACK/NACK and SR) may be used for SR transmission. A separate SR for D2D devices is required, because the SR of the current LTE-A is a resource request for cellular devices. To this end, a modification of LTE-A is required. According to embodiments of the present disclosure, 1-bit SR information may be added to PUCCH format 2 (Channel State Information (CSI)), PUCCH format 2a (transmission of CSI and 1-bit HARQ ACK/NACK), or PUCCH format 2b (transmission of CSI and 2-bit HARQ ACK/NACK) of LTE-A.

The prerequisites for the DRAR are that all D2D devices use the discovery signal transmission resources of the same size. Therefore, the eNB may allocate resources to D2D transmitting devices, even though the eNB receives only the DRAR which is 1-bit information. However, embodiments of the present disclosure are not limited to this method.

In LTE-A, control information such as Channel Quality indicator (CQI), Precode Matrix Index (PMI), Rank Indicator (RI), and HARQ ACK may be fed back to the eNB over a Physical Uplink Shared Channel (PUSCH). According to embodiments of the present disclosure, the DRAR may be transmitted to the eNB over the PUSCH, like the control information.

DBSR: In the above-described DRAR resource allocation request, the prerequisites are that all D2D devices use the discovery signal transmission resources of the same size. If the size (or amount) of the discovery signal transmission resources is different for each D2D device (e.g., if D2D data and control information are transmitted in D2D communication), the eNB may allocate a required amount of D2D transmission resources to each D2D device. In the existing LTE-A, a device may transmit its buffer status (e.g., the size (or amount) of data piled in the buffer) to the eNB (Buffer Status Report (BSR)), and the eNB may allocate uplink resources for the device based on the buffer status. The BSR of LTE may be transmitted in a MAC Packet Data Unit (PDU). A separate BSR for D2D devices are required, because the BSR of the current LTE-A is a resource request for cellular devices. To this end, a modification of LTE-A is required (addition of a logical channel identifier for a DBSR), and is the same as an index report for selected RBs described below.

Index Report for Selected RBs: Unlike the DRAR carrying only 1-bit information, the index report for selected RBs may require a feedback of many bits. Therefore, the index report for selected RBs may be transmitted through upper-layer signaling, instead of transmitting the index report for selected RBs over a physical channel such as a PUCCH or a PUSCH. Various Logical Channel IDentifiers (LCIDs) may be multiplexed in a MAC header of LTE-A, and the LCID may index different MAC control elements depending on its purpose, like the Buffer Status Report (BSR) and Power Headroom Report (PHR). If a device reports indexes of selected RBs for a D2D discovery resource allocation request, an additional MAC control element and an LCID are required. On the other hand, padding bits or dummy bits may be optionally added in the last part of the MAC PDU, and the device may be designed to report indexes of selected RBs using this part.

3) Method in which eNB Allocates Resources to D2D Transmitting Device

In order to allocate resources that a D2D transmitting device will use, the eNB may command the D2D devices that have requested resource allocation, to measure and report signals from adjacent eNBs. Since the D2D devices periodically measure and report signals from adjacent eNBs to the eNB in the cellular mode, the eNB may use the received report information intact. Because the eNB may predict the approximate location of each D2D transmitting device using the measurement results from the D2D transmitting devices, the eNB may perform resource allocation based on the measurement results. If the D2D transmitting devices that have requested resource allocation are located far away from each other, the eNB may allocate resources so that the D2D transmitting devices may transmit a discovery signal in the same resources. If the D2D transmitting devices that have requested resource allocation are located close to each other, the eNB may allocate resources so that the D2D transmitting devices may transmit a discovery signal in orthogonal resources. Prior to resource allocation, the eNB may determine whether the resources that the eNB will allocate to D2D transmitting devices may cause interference to cellular devices located in the eNB's cell or cellular devices located in an adjacent cell, on its own or in cooperation with the adjacent cell, and the eNB may stop the resource allocation or command to perform discovery in the next discovery subframe, if it is determined that the resources may cause interference.

4) Method of Enabling Reception of D2D Devices

In a D2D discovery process, a plurality of unspecified devices located close to a D2D transmitting device should be able to receive the discovery information transmitted by the D2D transmitting device, because no link connection has been established between D2D devices and the D2D devices operate in a broadcast way in D2D communication. All devices operate in the idle mode most of the time in order to reduce power consumption. All devices may receive a PDCCH transmitted by the eNB in an On-Duration mode (or active period) depending on each device's Discontinuous Reception (DRX) cycle. The PDCCH may be transmitted in every subframe, and the number of subframes over which a device should decode the PDCCH may be determined depending on an On-Duration timer of each device. During the remaining time, the device may operate in the idle mode and not receive the PDCCH transmitted by the eNB. Therefore, the eNB should perform paging so that D2D devices may receive discovery information (e.g., devices in the idle mode may receive the PDCCH). To this end, the eNB may measure a difference between the time that the eNB will perform dynamic resource allocation and the time that the D2D device receives the PDCCH in the On-Duration mode (the difference will be referred to as an offset), and may command the device whose offset is less than or equal to a predetermined threshold to continue to stay awake.

FIG. 1 illustrates an example of a frame structure for a static allocation method and a dynamic allocation method in an LTE system according to an embodiment of the present disclosure.

Referring to FIG. 1, a Frequency Division Duplexing (FDD) system is illustrated; however, the present disclosure is not limited to the FDD system. In the FDD system, a downlink and an uplink may use different frequency bands. As illustrated in FIG. 1, one frame 100 with a length of 10 ms may include 10 subframes. Each subframe may include 2 slots. Although not illustrated in FIG. 1, one slot may include 7 symbols when using a normal Cyclic Prefix (CP), and may include 6 symbols when using an extended CP. The slot may include Orthogonal Frequency Division Multiplexing (OFDM) symbols in a downlink and Single Carrier Frequency Division Multiple Access (SC-FDMA) symbols in an uplink.

In static allocation for D2D discovery, resource allocation information may be transmitted in an SIB 110, and a transmission period of an SIB may be designed to be 40 to 640 ms or more. D2D devices may match downlink synchronization with the system based on a synchronization signal, and receive information about the cell that the D2D devices have accessed, using a Master Information Block (MIB) transmitted over a Physical Broadcast CHannel (PBCH). For example, an MIB may include required parameter information such as DL system bandwidth, System Frame Number (SFN), Physical Hybrid-ARQ Indication Channel (PHICH) and the like. Devices, which have received an MIB, may receive a PDCCH transmitted from the eNB in every subframe. The PDCCH may carry downlink/uplink resource allocation information. Each device may decode SIB resource allocation information 120 and 140 existing in the PDCCH using the SI-RNTI that the device knows in advance. The device may obtain information about the frequency-time domain where an SIB is located, by decoding the PDCCH using the SI-RNTI, and may decode the SIB by decoding the frequency-time domain. Devices which have succeeded in decoding an SIB may obtain discovery subframe information included in the SIB, thereby obtaining information about the subframe(s) or consecutive frames in a frame, which are subframes for the purpose of discovery, and about the period of a discovery subframe. If there is a change in position of a discovery subframe in the frame (e.g., if a discovery subframe changes from a third subframe to a fifth subframe, or if the number of discovery subframes increases from one to two), the devices may provide information about the change using an SIB or a paging channel.

A device that transmits D2D discovery information may select the discovery resources that the device will transmit, from among the subframe(s). Alternatively, the eNB may select discovery resources and provide information about the discovery resources to the device. A device that receives D2D discovery information may receive the allocated discovery subframe(s) through an SIB and decode the received discovery subframe(s). In the discovery subframe, a PUCCH for transmission of a cellular uplink feedback (e.g., SR, HARQ ACK/NACK and the like) may exist in the upper and lower parts on the frequency axis. Depending on the scheduling by the eNB, the number of RBs occupied by a PUCCH in every subframe may vary, so information about the number of discovery RBs may be included in discovery resource allocation information included in an SIB in order to inform that the remaining RBs except for the RBs of the PUCCH may be used for discovery.

In the dynamic allocation method, unlike in the static allocation method in which resource allocation information is transmitted in an SIB, the resource allocation information may be transmitted over a PDCCH. This transmission is the same as the transmission of resource allocation information for the cellular devices in the existing LTE system. However, unlike in the existing cellular system, in the D2D discovery process, D2D devices have not yet established a link. Therefore, it is necessary to case a plurality of unspecified D2D devices to receive discovery information. In the existing LTE, each of the cellular transmitting and receiving devices may transmit, over a PDCCH, allocation information about the resources that the device will use, and each device may obtain information corresponding to the device itself from the PDCCH using its Cell-Radio Network Temporary Identifier (C-RNTI). However, in the D2D communication scheme, due to the broadcast characteristics of discovery information, a D2D transmitting device may obtain information about the resource allocation pool that the device should transmit, from the PDCCH using its C-RNTI if dynamic allocation is applied, but a new RNTI needs to be defined for D2D receiving devices. In the D2D discovery process, a D2D device should receive the entire D2D resource pool when the D2D device transmits no data. Therefore, a broadcast RNTI or a group-cast RNTI is required to allow D2D receiving devices to obtain information about the common resource allocation pool with one RNTI, instead of allocating a C-RNTI to a device on an individual basis. In the present disclosure, the broadcast RNTI or group-cast RNTI will be referred to as a 'D2D-RNTI'. All D2D receiving devices that do not transmit discovery information may obtain information about the resource pool that they should receive, using the D2D-RNTI.

Figure 2:
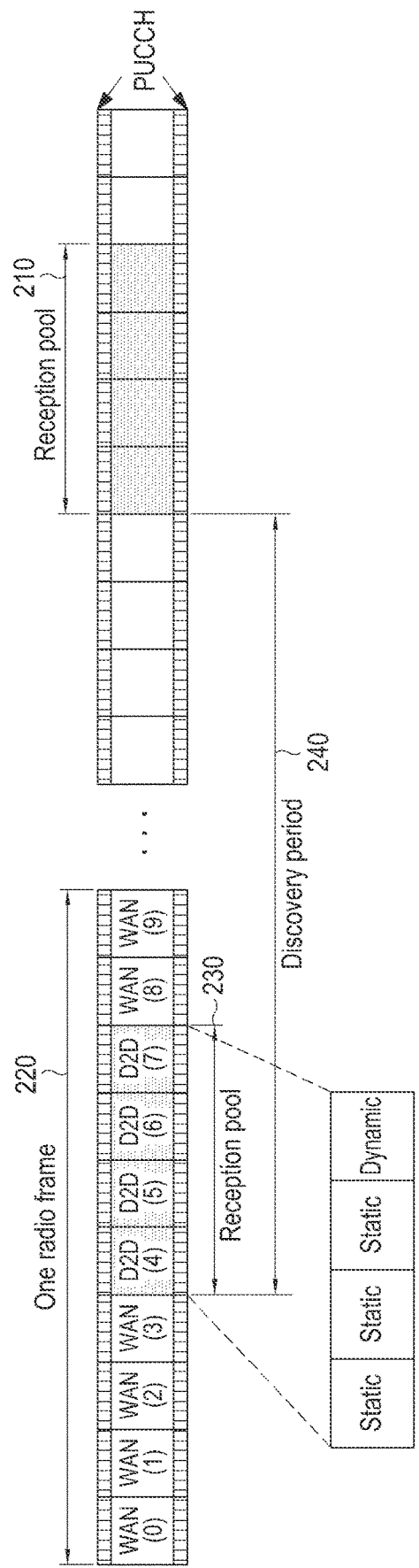
FIG. 2 illustrates an example of a method of allocating Device-to-Device (D2D) resources by an enhanced Node B (eNB) in a static (or semi-static) allocation method according to an embodiment of the present disclosure.

FIG. 2 illustrates an example of a method of allocating D2D resources by an eNB in a static (or semi-static) allocation method according to an embodiment of the present disclosure.

Referring to FIG. 2, D2D transmission/reception is performed in an uplink band in the FDD system. Wide Area Network (WAN) represents a subframe for transmission of uplink data by a cellular device, and D2D represents a subframe for D2D discovery or D2D communication. In FIG. 2, one radio frame 220 may include 10 subframes. It will be assumed that in one radio frame 220, 6 subframes are allocated for cellular uplink communication, and the other 4 subframes are allocated as D2D resources. Although it is assumed in FIG. 2 that 4 consecutive subframes are allocated as D2D resources, non-consecutive subframes may be allocated as D2D resources. These D2D resources may be repeatedly allocated in every discovery period 240. The eNB may inform the positions of D2D reception pools 210 and 230 using an SIB, and may also inform the position of a D2D transmission pool using an SIB. For example, it will be assumed that two different D2D transmission modes like the static allocation method and the dynamic allocation method are supported at the same time. A D2D receiving device should receive all the pools regardless of whether the allocation is static allocation or dynamic allocation. Therefore, the D2D receiving device may perform D2D reception, only if the D2D receiving device has D2D reception resource pool information received through an SIB. However, from the viewpoint of the D2D transmitting device, since a resource pool allocated in the static allocation method is different from a resource pool allocated in the dynamic allocation method, a D2D transmission resource pool should be transmitted to a D2D device through separate signaling. For example, in FIG. 2, if a reception resource pool (4 subframes with subframe indexes 4, 5, 6 and 7) and a transmission resource pool (3 subframes with subframe indexes 4, 5 and 6) are allocated through an SIB, a D2D receiving device may receive 4 subframes corresponding to the subframe indexes 4, 5, 6 and 7, and a D2D transmitting device may select RBs for D2D transmission from the 3 subframes corresponding to the subframe indexes 4, 5 and 6 by the greedy method or a random resource selection method. The remaining subframe with a subframe index 7 is resources used by the eNB for dynamic resource allocation. When performing dynamic resource allocation, the eNB may allocate an RB corresponding to a specific time-frequency domain in the subframe with the subframe index 7 to the D2D transmitting device that has requested D2D transmission resources, through PDCCH or Radio Resourced Control (RRC) signaling, allowing the D2D transmitting device to use the RB for D2D transmission.

The eNB may allocate some of the reception pool resource in D2D resource allocation (e.g. static, semi-static or dynamic allocation). The eNB transmits the reception pool resource using the SIB to the device.

Figure 3:
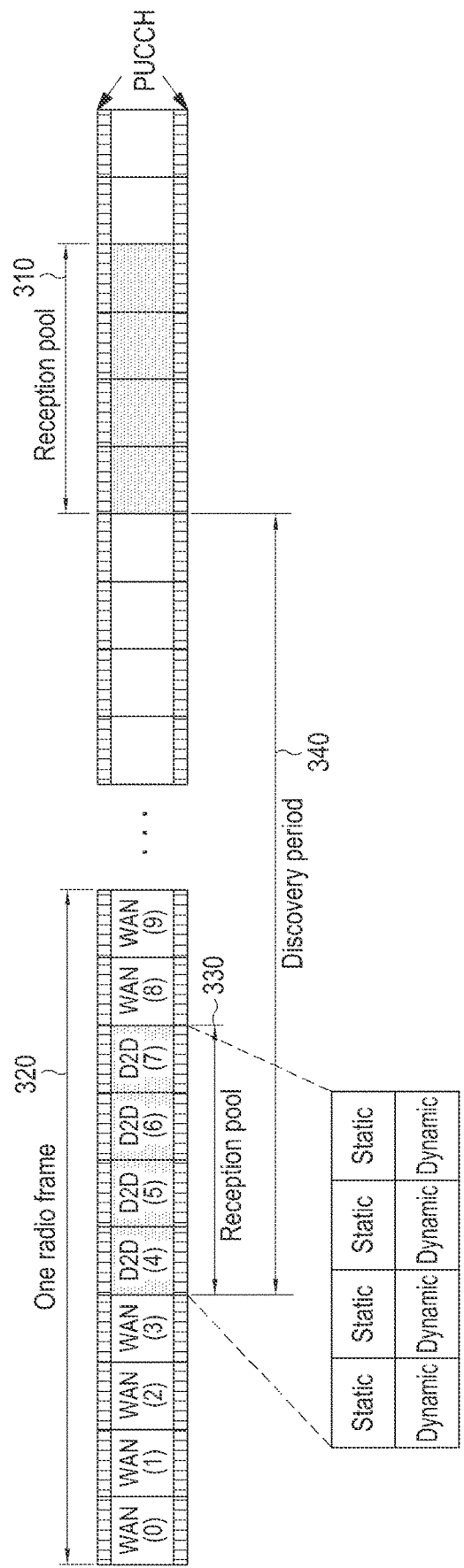
FIG. 3 illustrates another example of a method of allocating D2D resources by an eNB in a static (or semi-static) allocation method according to an embodiment of the present disclosure.

FIG. 3 illustrates another example of a method of allocating D2D resources by an eNB in a static (or semi-static) allocation method according to an embodiment of the present disclosure.

Referring to FIG. 3, two different D2D transmission modes undergo Frequency Division Multiplexing (FDM) in a D2D reception pool.

As in FIG. 2, a D2D device may receive D2D reception pools 310 and 330 using an SIB. A D2D receiving device may receive and decode all RBs located in the D2D reception pools 310 and 330. The D2D resources may be repeatedly allocated in every discovery period 340. In order to support different D2D transmission modes by the static resource allocation and dynamic resource allocation, the eNB may transmit information about the number of RBs in the frequency domain for static allocation, using an SIB.

Although it is assumed in FIG. 3 that static allocation is the same as the dynamic allocation in terms of the number of RBs in every subframe, the allocation may be different in every subframe. In this case, the number of RBs that can be used for static allocation in each subframe should be notified to D2D devices using an SIB.

Figure 4:
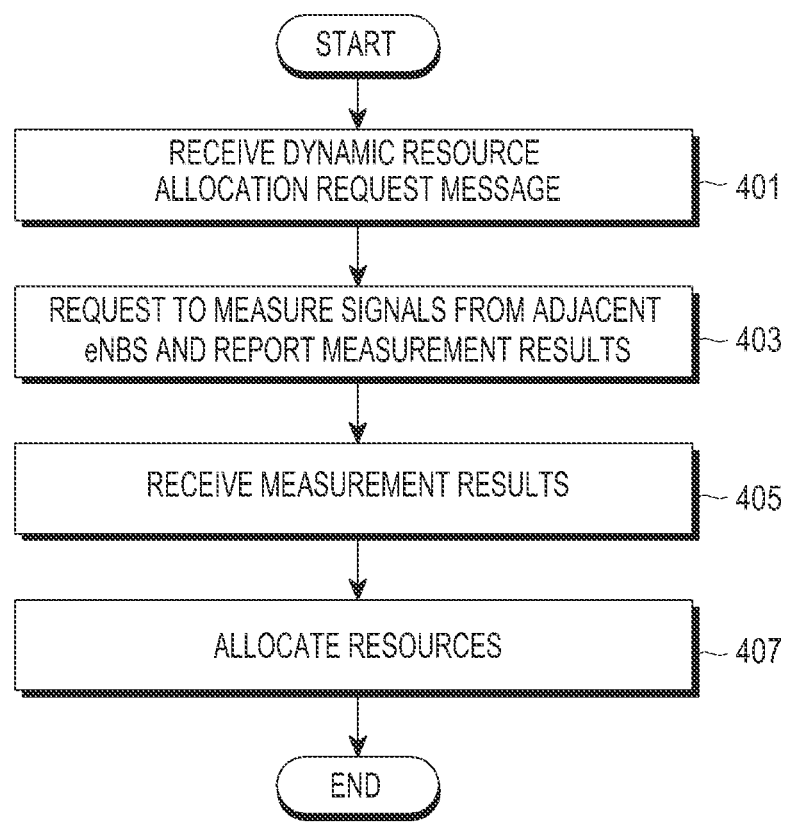
FIG. 4 is a flowchart illustrating an example of a method of allocating discovery resources according to an embodiment of the present disclosure.

FIG. 4 is a flowchart illustrating an example of a method of allocating discovery resources according to an embodiment of the present disclosure.

Referring to FIG. 4, in operation 401, the eNB receives a dynamic resource allocation request message from D2D devices. The dynamic resource allocation request message may include a 1-bit DRAR, one RB that a D2D transmitting device has selected from a discovery subframe, or indexes of a plurality of RBs. An index of the selected RB(s) may include a few or tens of bits. The DRAR may be transmitted over a PUCCH which is an uplink control channel, or may be transmitted over a PUSCH which is an uplink data channel. If the DRAR is transmitted over the PUSCH, the DRAR may be multiplexed with other information (e.g., CQI, RI, PMI, HARQ-ACK, and the like).

A DBSR or a Selected RB Index (SRBI) (or an index of a selected RB(s)) may be transmitted through upper-layer signaling. A new LCID indicating an index of a selected RB(s) may be defined in a MAC header, or a padding part at the end of a MAC PDU may be used.

In operation 403, the eNB requests at least one device that has sent the dynamic resource allocation request message in operation 401 to measure and report signals from adjacent eNBs.

In operation 405, the eNB receives the measurement results from the at least one device.

In operation 407, the eNB allocates resources to the at least one device based on the measurement results. Upon resource allocation, the eNB may enable D2D devices in RRC IDLE state to receive data.

Figure 5:
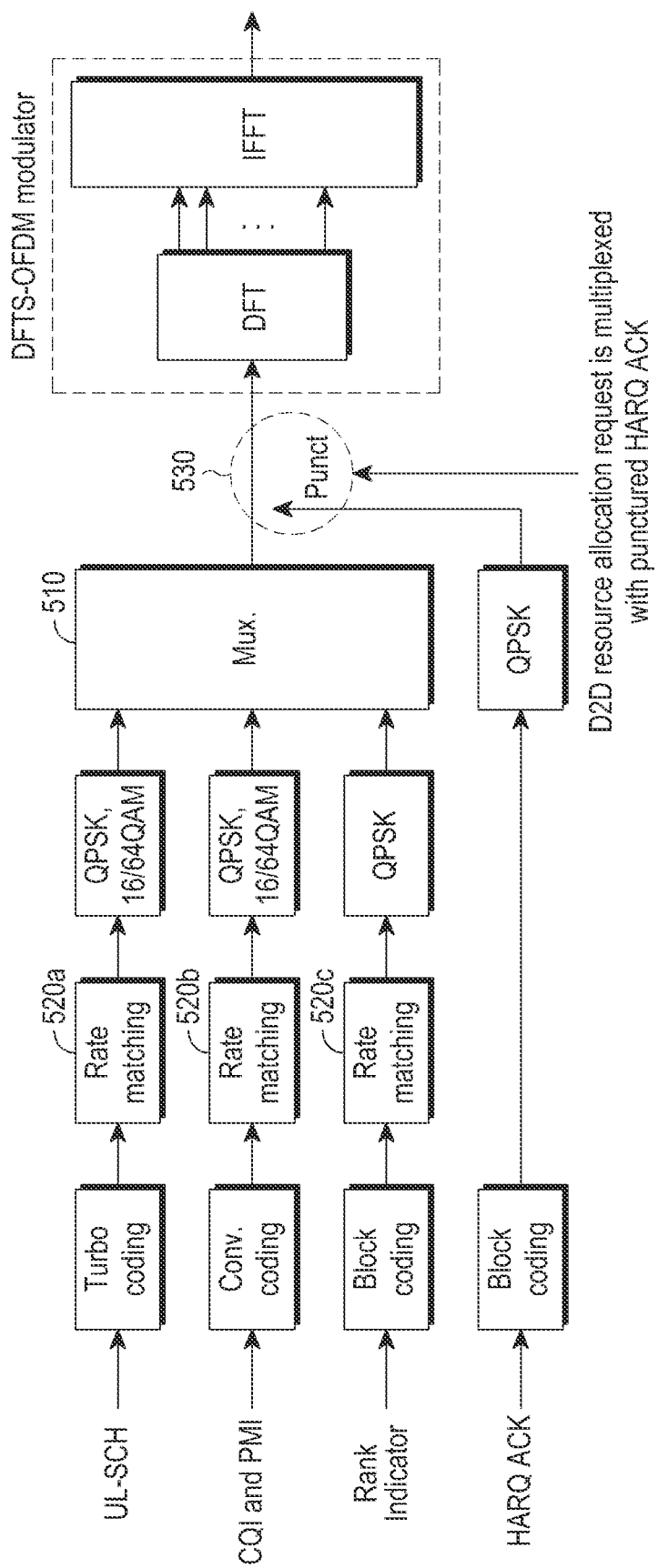
FIG. 5 illustrates an example of a method of transmitting a D2D Resource Allocation Request (DRAR) according to an embodiment of the present disclosure.

FIG. 5 illustrates an example of a method of transmitting a DRAR according to an embodiment of the present disclosure. In the case of FIG. 5, a PUSCH which is an uplink data channel is used.

Referring to FIG. 5, in LTE-A, control information such as CQI, PMI, RI, and HARQ ACK may be fed back to the eNB over a PUSCH. According to embodiments of the present disclosure, a D2D resource allocation request message such as a DRAR may be sent to the eNB over a PUSCH together with the control information. Although not illustrated in FIG. 5, before performing channel encoding, the eNB may perform code block segmentation, insert a Cyclic Redundancy Check (CRC) into each code block, and send the code block to a Forward Error Correction (FEC) unit. Thereafter, data information transmitted over a UL-SCH and control information such as CQI & PMI and RI may undergo turbo coding, convolutional coding and block coding, respectively, and the outputs thereof may undergo rate matching and modulation suitable for their channel conditions. For example, however, RI may undergo Quadrature Phase Shift Keying (QPSK) modulation at all times.

A Multiplexer (MUX) 510 may convert, into one type of data, three types of data that have passed through rate matching units 520a to 520c after being demultiplexed for each component by a Demultiplexer (DEMUX) (not shown). The multiplexer 510 may multiplex the D2D resource allocation request message with a punctured HARQ ACK as shown by reference numeral 530.

Figure 6:
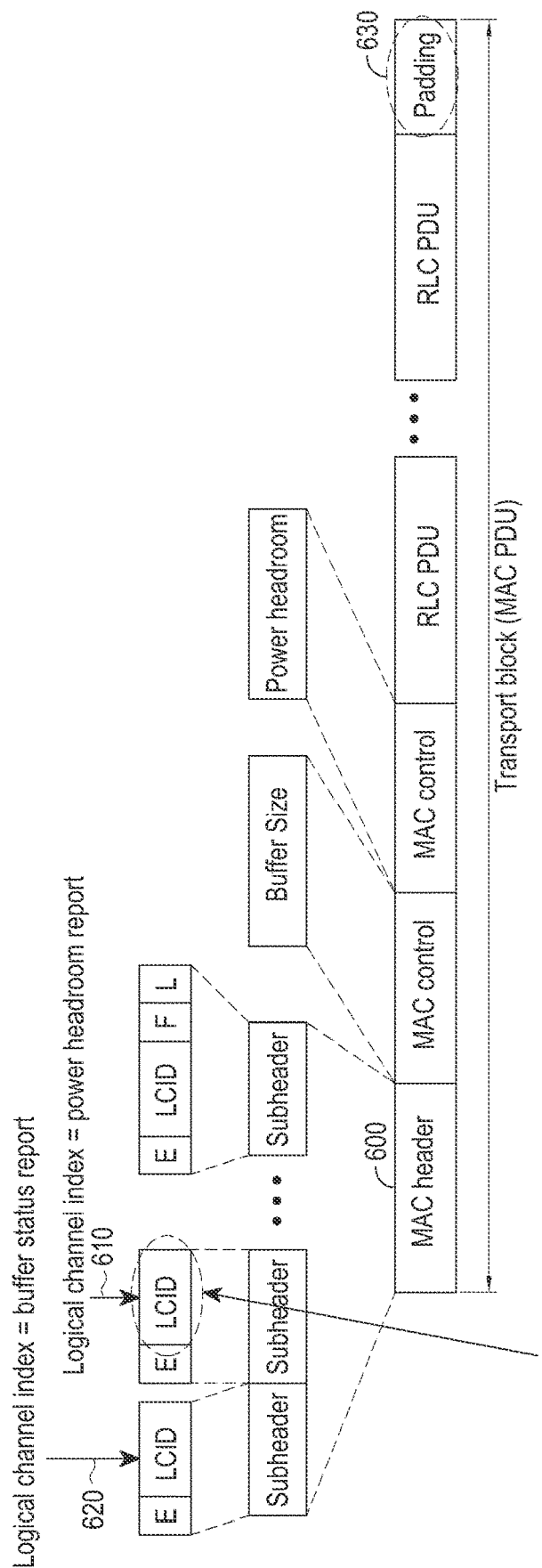
FIG. 6 illustrates an example of a method of reporting a D2D Buffer Status Report (DBSR) and an SRBI according to an embodiment of the present disclosure.

FIG. 6 illustrates an example of a method of reporting a DBSR and an SRBI according to an embodiment of the present disclosure.

Referring to FIG. 6, an LCID may be used for an example of a method of reporting a DBSR and an SRBI according to an embodiment of the present disclosure.

Various LCIDs may be multiplexed in a MAC header 600 of LTE-A, and the LCIDs may index different MAC control elements depending on their purposes, like the buffer status report and the power headroom report. The LCIDs will be referred to as local channel indexes 610 and 620 in FIG. 6. If a DBSR and an SRBI are reported for a D2D discovery resource allocation request, an additional MAC control element and an LCID are required. For example, the DBSR and the SRBI may be represented using additional logical channel indexes.

Padding 630 may be optionally added at the end of a MAC PDU. The MAC PDU may be designed using the padding 630 to report a DBSR and an SRBI.

Figure 7:
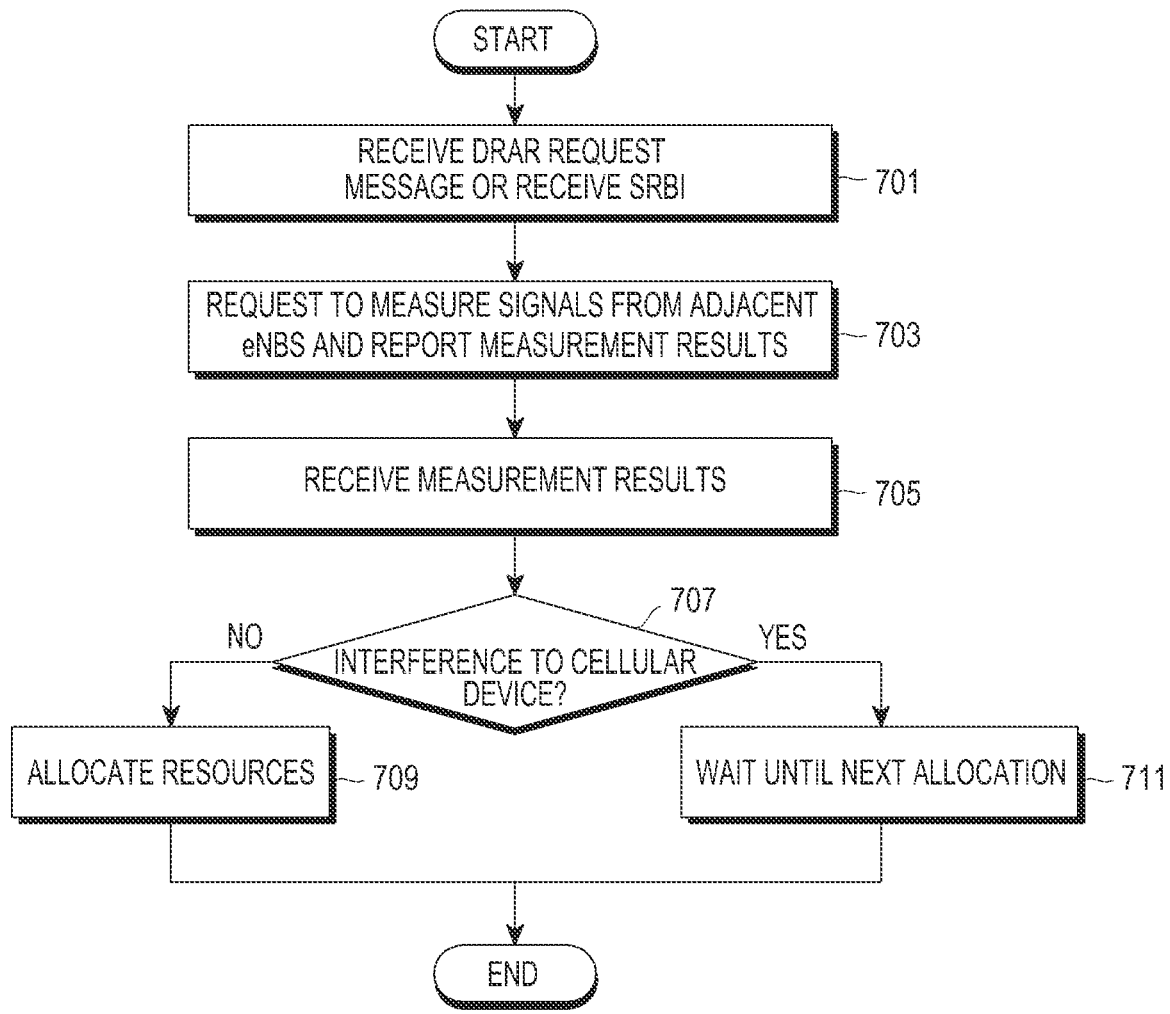
FIG. 7 is a flowchart illustrating an example of an operation of an eNB according to an embodiment of the present disclosure.

FIG. 7 is a flowchart illustrating an example of an operation of an eNB according to an embodiment of the present disclosure.

Referring to FIG. 7, in operation 701, the eNB receives a DRAR or a DBSR and an SRBI. Upon receiving the DRAR or the SRBI, the eNB commands the D2D devices that have transmitted the DRAR or the DBSR and the SRBI to measure and report signals from adjacent eNBs in operation 703. The eNB may use the received report information intact because the D2D devices periodically report signals from adjacent eNBs to the eNB in the cellular mode. In operation 705, the eNB receives results on measurements of received signal strengths or Signal-to-Interference and Noise Ratios (SINRs) from adjacent eNBs, which are measured by the D2D device that has transmitted the DRAR or the DBSR and the SRBI.

In operation 707, the eNB determines whether the resources allocated to a D2D transmitting device cause interference to cellular devices. If it is determined that the allocated resources cause interference, the eNB may stop the resource allocation or may command the D2D device to perform discovery in the next discovery subframe, in operation 711.

However, if it is determined that the allocated resources will not cause interference, the eNB performs resource allocation based on the measurement results in operation 709. The eNB may approximate the location of each D2D transmitting device using the measurement results from the D2D device, so the eNB may perform resource allocation based on the predicted location. If the D2D transmitting devices that have requested resource allocation are located far away from each other, then the eNB may allocate resources so that the D2D transmitting devices may transmit a discovery signal in the same resources. On the other hand, if the D2D transmitting devices that have requested resource allocation are located close to each other, the eNB may allocate resources so that the D2D transmitting devices may transmit a discovery signal in orthogonal resources.

Figure 8:
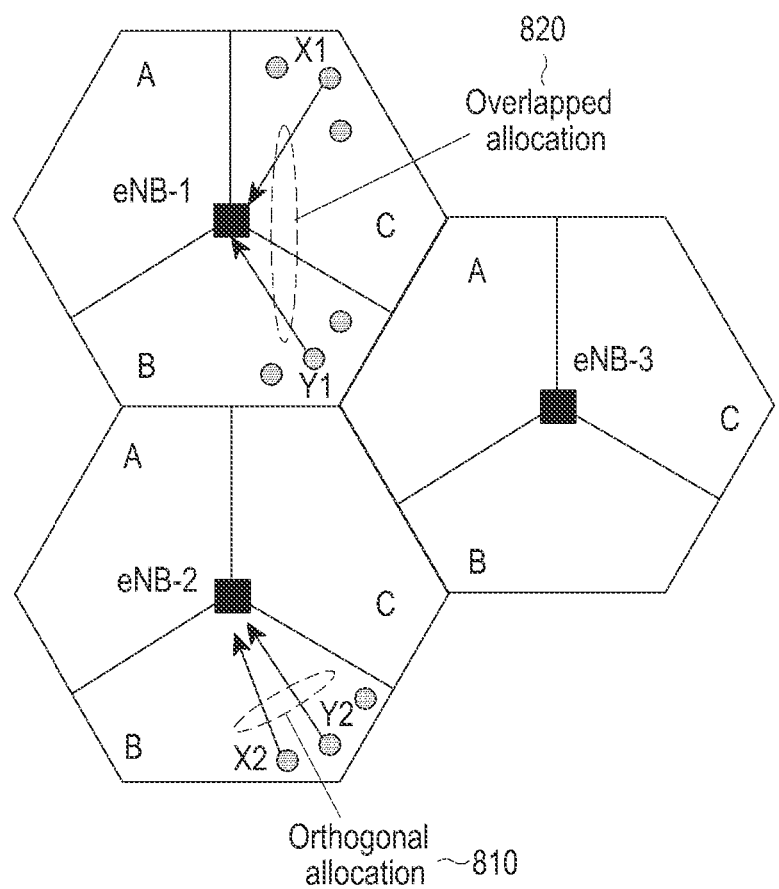
FIG. 8 illustrates an example of a method of allocating resources using signal strengths or Signal-to-Interference and Noise Ratios (SINRs) for adjacent eNBs that a D2D device has measured, by an eNB according to an embodiment of the present disclosure.

FIG. 8 illustrates an example of a method of allocating resources using signal strengths or SINRs for adjacent eNBs that a D2D device has measured, by an eNB according to an embodiment of the present disclosure.

Referring to FIG. 8, for convenience of description, three cells are schematized, and each cell may include three sectors. The eNBs governing (or in charge of) the cells will be referred to as an eNB-1, an eNB-2 and an eNB-3, and the sectors of each cell will be represented by A, B, and C, respectively. It will be assumed that in sectors C and B of the cell governed by the eNB-1, devices X1 and Y1 have measured signals from adjacent eNBs and reported the measured signals to the eNB-1, respectively. The devices X1 and Y1 are devices that have requested resource allocation. It will also be assumed that in a sector B of the cell governed by the eNB-2, devices X2 and Y2 have measured signals from adjacent eNBs and reported the measured signals to the eNB-2. With respect to the eNB-1, since the signal strengths from the adjacent eNBs that the devices X1 and Y1 have reported may be different from each other, the eNB-1 may determine that the devices X1 and Y1 are located far away from each other. Therefore, the eNB-1 may perform resource allocation so that the devices X1 and Y1 may perform discovery using the same resources (or overlapping resources) 820.

On the other hand, the eNB-2 may determine that the devices X2 and Y2 are not located far away from each other, based on the reports from the devices X2 and Y2, and perform scheduling so that the devices X2 and Y2 may be allocated orthogonal resources 810.

Figure 9:
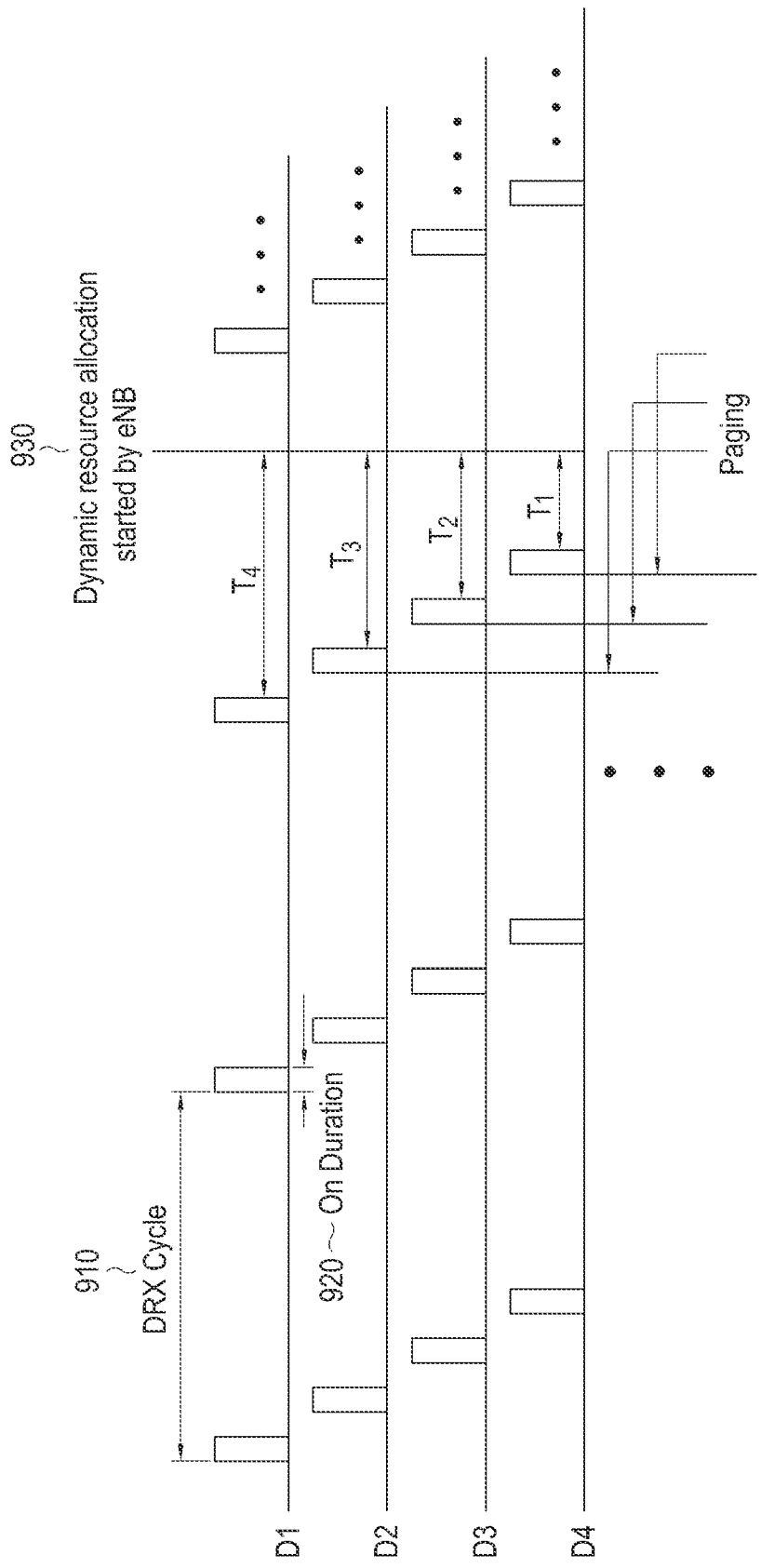
FIG. 9 illustrates an example of paging devices that should receive D2D discovery and communication information, by an eNB according to an embodiment of the present disclosure.

FIG. 9 illustrates an example of paging devices that should receive D2D discovery and communication information, by an eNB according to an embodiment of the present disclosure.

Referring to FIG. 9, each of the devices D1, D2, D3, and D4 may receive a PDCCH transmitted by the eNB in an On-Duration mode 920 depending on its DRX cycle 910. The DRX cycle 910 corresponds to a distance between any active period and the next active period. As the DRX cycle length is longer, a sleep period may be longer, reducing the device's power consumption. However, if the DRX cycle length is long, call delay for a device may increase. The DRX cycle length may be signaled by the network.

A length of the On-Duration 920 may mean a length of a period for which a device stays awake during one active period, and commonly, a predetermined value may be used for the length of the On-Duration 920.

The PDCCH may be transmitted in every subframe, and the number of subframes over which a device should decode the PDCCH may be determined depending on the On-Duration timer of each device. During the remaining time, the device may operate in the IDLE mode and may not receive the PDCCH transmitted by the eNB. Therefore, the eNB should perform paging so that D2D devices may receive discovery information (e.g., devices in the IDEL mode may wake up and receive the PDCCH). To this end, the eNB should measure a difference between the time 930 that the eNB will perform resource allocation to the D2D device and the time that the D2D device receives the PDCCH in the On-Duration mode (e.g., the offset), and should command the device whose offset is less than or equal to a predetermined threshold to continue to stay awake. In FIG. 9, T1, T2, T3 and T4 each represent an offset, which is a difference between the time that the eNB will perform resource allocation and the time that the D2D device receives the PDCCH in the On-Duration mode. The eNB may command only the device whose offset is less than or equal to a predetermined threshold to continue to stay awake.

A resource allocation method according to another embodiment of the present disclosure is described below.

Embodiments of the present disclosure relate to a resource allocation method and apparatus for transmitting a D2D discovery signal, and more particularly, to a method in which a device, which operates with resources allocated by static/semi-static resource allocation, requests conditions (e.g., congestion, delay requirement, priority or the like) for requesting dynamic resource allocation and requests dynamic resource allocation, from the eNB, and a method in which the eNB allocates discovery resources upon receiving the request.

Figure 10:
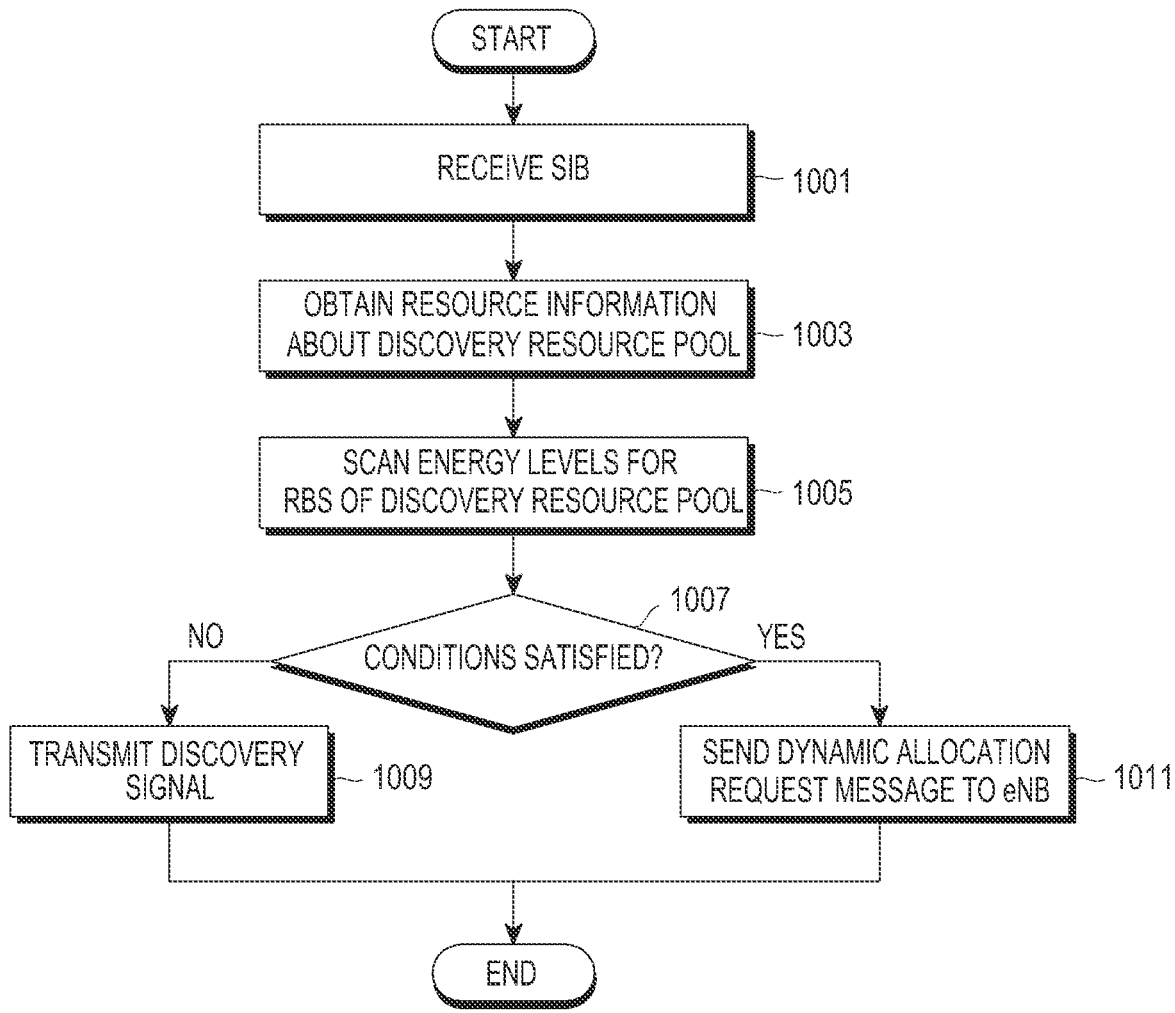
FIG. 10 is a flowchart illustrating an example of a method of allocating resources according to another embodiment of the present disclosure.

FIG. 10 is a flowchart illustrating an example of a method of allocating resources according to another embodiment of the present disclosure.

Referring to FIG. 10, in operation 1001, a D2D device receives an SIB over a PDCCH. In operation 1003, the D2D device obtains resource information about a discovery resource pool through the received SIB. In operation 1005, the D2D device scans energy levels for RBs of the discovery resource pool.

The D2D device determines in operation 1007 whether the scanning results satisfy predetermined conditions. If the scanning results do not satisfy predetermined conditions, the D2D device transmits a discovery signal in operation 1009.

However, if the scanning results satisfy predetermined conditions, the D2D device sends a dynamic allocation request message to the eNB in accordance with embodiments of the present disclosure in operation 1011. The conditions (e.g., the above predetermined conditions) for switching from the static resource allocation to the dynamic resource allocation are as follows.

1) Conditions for Switching from Static Resource Allocation to Dynamic Resource allocation Congestion Post-action: The conditions may include a case where energy levels of all RBs are higher than a specific threshold, or a case where no RB has an energy level lower than a specific threshold.

Pre-action: The conditions may include a case where an RB has an energy level lower than a specific threshold but there is little margin between the energy level of the RB and the threshold, or a case where the number of RBs having energy levels lower than a specific threshold is less than or equal to a predetermined number.

Priority (Delay Requirement)

The conditions may include a case where energy levels of all RBs are higher than a specific threshold in a process where, for example, D2D devices whose priority (delay requirement class) is greater than or equal to 3 participate in discovery.

The priority (delay requirement class) information may be obtained through a logical entity (e.g., a priority handler, a delay requirement handler or the like) existing in the network, when a D2D device initially enters the network or an application of a D2D device is turned on or executed. The logical entity may be separately located in a D2D server or an application server, or may be located in an MME, an S-Gateway, a P-Gateway, or the like.

Change in Amount of Discovery Information

The conditions may include a case where, in a process where, for example, D2D devices whose priority (delay requirement class) is greater than or equal to 3 participate in discovery, additional resource allocation is required due to a change in amount of discovery information though energy levels of all RBs are not higher than a specific threshold.

2) Method in which Device Requests Resource Allocation from eNB

Post-action for congestion, priority, delay requirement:
D2D resource allocation request (scheduling request)
Pre-action for congestion: report index of selected RB(s)

The conditions may include a case where an RB having an energy level lower than a specific threshold is selected but there is little margin between the energy level of the selected RB and the threshold.

The conditions may include a case where the number of RBs having energy levels lower than a specific threshold is less than or equal to a predetermined number.

3) Process in which Upon Resource Allocation, eNB Enables Devices in IDLE Mode to Receive Data.

Figure 11:
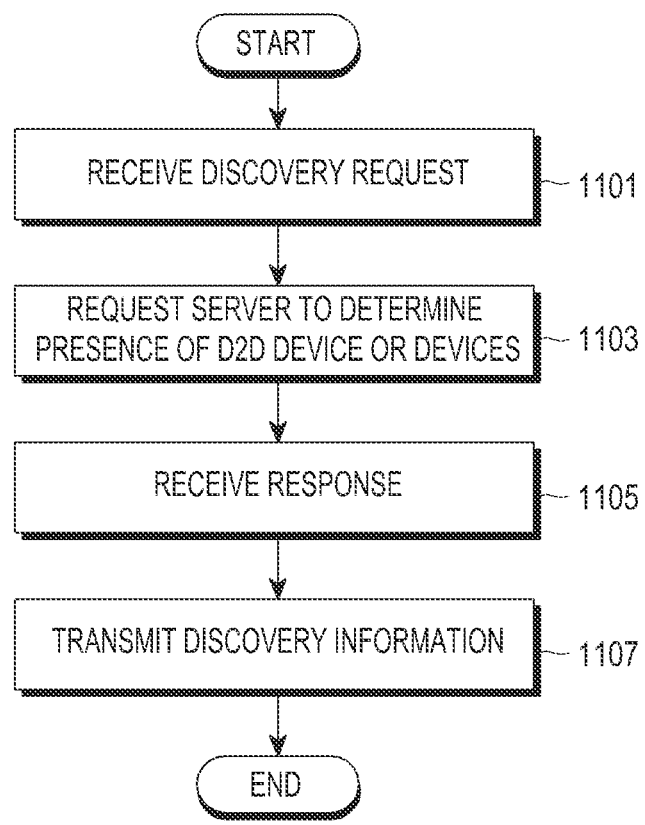
FIG. 11 is a flowchart illustrating an example of a process of discovering D2D devices located in the same cell when using a network discovery scheme according to an embodiment of the present disclosure.

FIG. 11 is a flowchart illustrating an example of a process of discovering D2D devices located in the same cell when using a network discovery scheme according to an embodiment of the present disclosure.

Referring to FIG. 11, in operation 1101, the eNB receives a discovery request from a D2D device that desires to perform discovery. Upon receiving the discovery request from the D2D device, the eNB requests a D2D server to determine the presence of a D2D device or devices that the D2D device desires to discover in operation 1103. The D2D server may determine whether the D2D device exists in the cell that the D2D server governs, or whether the D2D device exists in another cell. The D2D server may exist in an MME, a Home Subscriber Server (HSS), a Serving Gateway (S-GW), a PDN Gateway (P-GW), or a location server, or may be a separate logical entity. In operation 1105, the eNB receives from the D2D server a response indicating the presence of a D2D device or devices. Upon receiving from the D2D server the response indicating the presence of a D2D device or devices that the D2D device desires to discover in the cell that the D2D server governs, the eNB transmits discovery information to the D2D device or devices in the cell using the unicasting/multicasting/broadcasting method in operation 1107.

Embodiments of the present disclosure may address the congestion that may occur in the semi-static/static resource allocation method, or may allocate resources using the dynamic resource allocation method without waiting for the longer discovery signal transmission period to satisfy the delay requirements. According to embodiments of the present disclosure, D2D devices with a high priority may be dynamically allocated resources for a D2D discovery signal from the eNB upon request, if the D2D devices cannot transmit the D2D discovery signal due to the lack of resources. Embodiments of the present disclosure may efficiently perform D2D discovery through such resource allocation.

Embodiments of the present disclosure, similar to techniques according to the related art, may allocate a specific subframe or a plurality of subframes, for D2D discovery, based on the static allocation method. Each device that desires to transmit discovery information in the subframe(s) that are allocated through the static allocation, may select the discovery resources by which the device desires to transmit the discovery information, based on the energy levels of discovery signals received from the devices located close to the device. However, this method may not address the congestion problems or delay requirements and the priority problems, which may occur in the semi-static/static resource allocation method. In the eNB's coverage (e.g., in the environment having an eNB), the eNB cannot address these problems. Therefore, if the aforementioned problems occur, a device may request discovery resource allocation from the eNB. Upon receiving the resource allocation request from the device, the eNB may allocate resources for transmission of discovery information to the device through the persistent, semi-persistent or dynamic resource allocation.

Embodiments of the present disclosure may efficiently use D2D discovery resources based on resource allocation with the help of the eNB.

Figure 12:
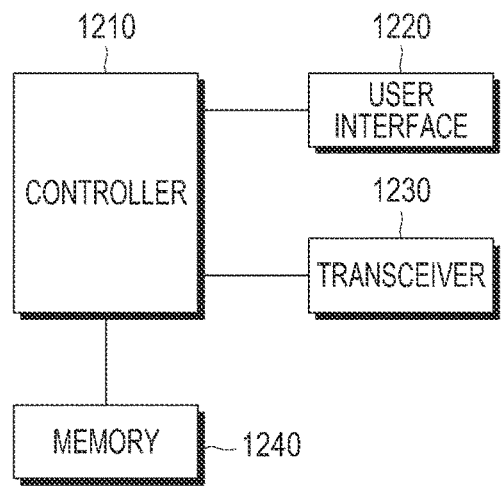
FIG. 12 illustrates a structure of a device in D2D communication in a wireless network according to an embodiment of the present disclosure.

FIG. 12 illustrates a structure of a device in D2D communication in a wireless network according to an embodiment of the present disclosure.

Referring to FIG. 12, the device includes a controller 1210, a user interface 1220, a transceiver 1230, and a memory 1240.

The transceiver 1230 may include a transmission module and a reception module for transmitting and receiving data to/from the eNB in D2D communication in a wireless network according to an embodiment of the present disclosure. The transceiver 1230 may send a resource request message to the eNB. In an embodiment of the present disclosure, the transceiver 1230 may transmit a DRAR or an SRBI to the eNB.

The transceiver 1230, under control of the controller 1210, may discover nearby devices for D2D communication, and form a link to all or some of the discovered nearby devices. The transceiver 1230 may transmit a discovery signal under control of the controller 1210.

The controller 1210 may request resource allocation from the eNB according to an embodiment of the present disclosure. The controller 1210 may obtain information about a resource block for discovery through a received SIB, scan an energy level for the resource block, determine whether the scanning results satisfy a predetermined condition, and request dynamic resource allocation from the eNB if the scanning results satisfy the predetermined condition.

The memory 1240 may store or extract various data needed to request discovery resource allocation from the eNB in D2D communication in a wireless network according to an embodiment of the present disclosure.

The user interface 1220 may deliver, to the controller 1210, the information that is entered by the user's manipulation, or may provide necessary information to the user under control of the controller 1210.

Figure 13:
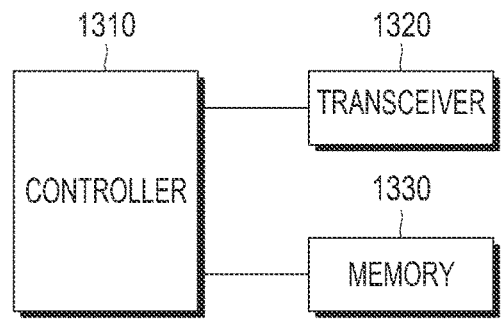
FIG. 13 illustrates a structure of an eNB in D2D communication in a wireless network according to an embodiment of the present disclosure.

FIG. 13 illustrates a structure of an eNB in D2D communication in a wireless network according to an embodiment of the present disclosure.

Referring to FIG. 13, the eNB includes a controller 1310, a transceiver 1320, and a memory 1330.

The transceiver 1320 may transmit and receive data to allocate discovery resources to a device in D2D communication in the wireless network according to an embodiment of the present disclosure.

The memory 1330 may store or retrieve various data needed to allocate discovery resources to the device in D2D communication in the wireless network according to an embodiment of the present disclosure.

The controller 1310 may allocate discover resources by the dynamic allocation method or the semi-persistent allocation method in D2D communication in the wireless network according to an embodiment of the present disclosure.

When the eNB allocates an RB for transmission of discovery information to a device, the controller 1310 may allocate resources to a specific D2D device by dynamically changing the time or frequency location of resources in every subframe, or may equally allocate the same time or frequency location to a specific D2D device in consecutive subframes.

Figure 14:
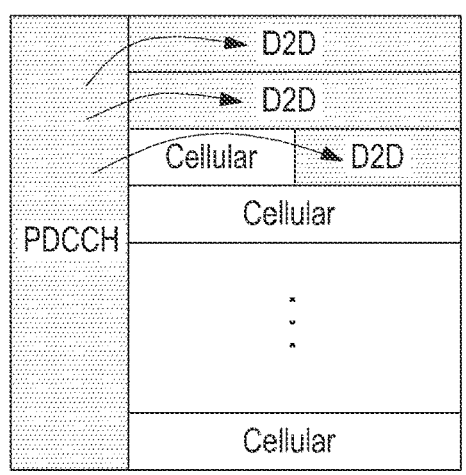
FIG. 14 illustrates a D2D frame structure included in a downlink according to an embodiment of the present disclosure.
Figure 15:
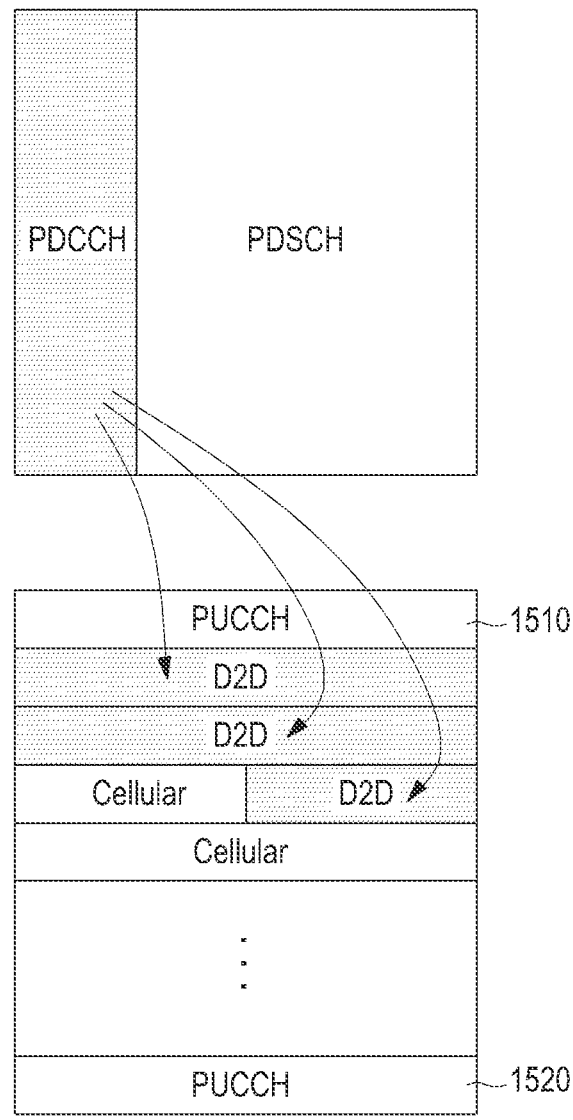
FIG. 15 illustrates a D2D frame structure included in an uplink according to an embodiment of the present disclosure.

For resource allocation, the eNB may allocate a resource pool that a device will transmit/receive in a downlink or an uplink, through a PDCCH (see FIG. 14 for the downlink and FIG. 15 for the uplink). This allocation information may be delivered using a Downlink Control Information (DCI) format in the PDCCH. The eNB may perform CRC scrambling using C-RNTIs of transmitting/receiving devices, and the devices may perform blind decoding on the DCI formats using their C-RNTIs. For this resource allocation, discovery information should be delivered to a plurality of unspecified devices. The transmitting device may re-use the existing C-RNTI, and the receiving device may require a new D2D-RNTI.

FIG. 14 illustrates a D2D frame structure included in a downlink according to an embodiment of the present disclosure, and FIG. 15 illustrates a D2D frame structure included in an uplink according to an embodiment of the present disclosure.

Referring to FIGS. 14 and 15, the eNB may allocate a resource pool that a device will transmit/receive in the downlink in FIG. 14 and the uplink in FIG. 15, through a PDCCH.

Referring to FIG. 14, a part of the frame included in the downlink may be allocated as resources for D2D communication, which are allocated through a PDCCH, and the other part may be allocated as resources for cellular communication.

Referring to FIG. 15, a part of the frame, from which PUCCHs 1510 and 1520 are excluded, may be allocated as resources for D2D communication, which are allocated through a PDCCH, and the other part may be allocated as resources for cellular communication.

A new DCI format or a modified existing DCI format is required to receive the frame in the uplink and the downlink. Downlink scheduling allocation information may be effective during the same subframe in which a signal is transmitted, and the scheduling allocation information may be transmitted by selecting one of the DCI formats.

The eNB may use a DCI format 0 during uplink allocation, use DCI formats 1/1A/1B/1C/1D/2/2A/2B during downlink allocation, and use DCI formats 3/3A during uplink power control. However, embodiments of the present disclosure are not limited to these methods.

Figure 16:
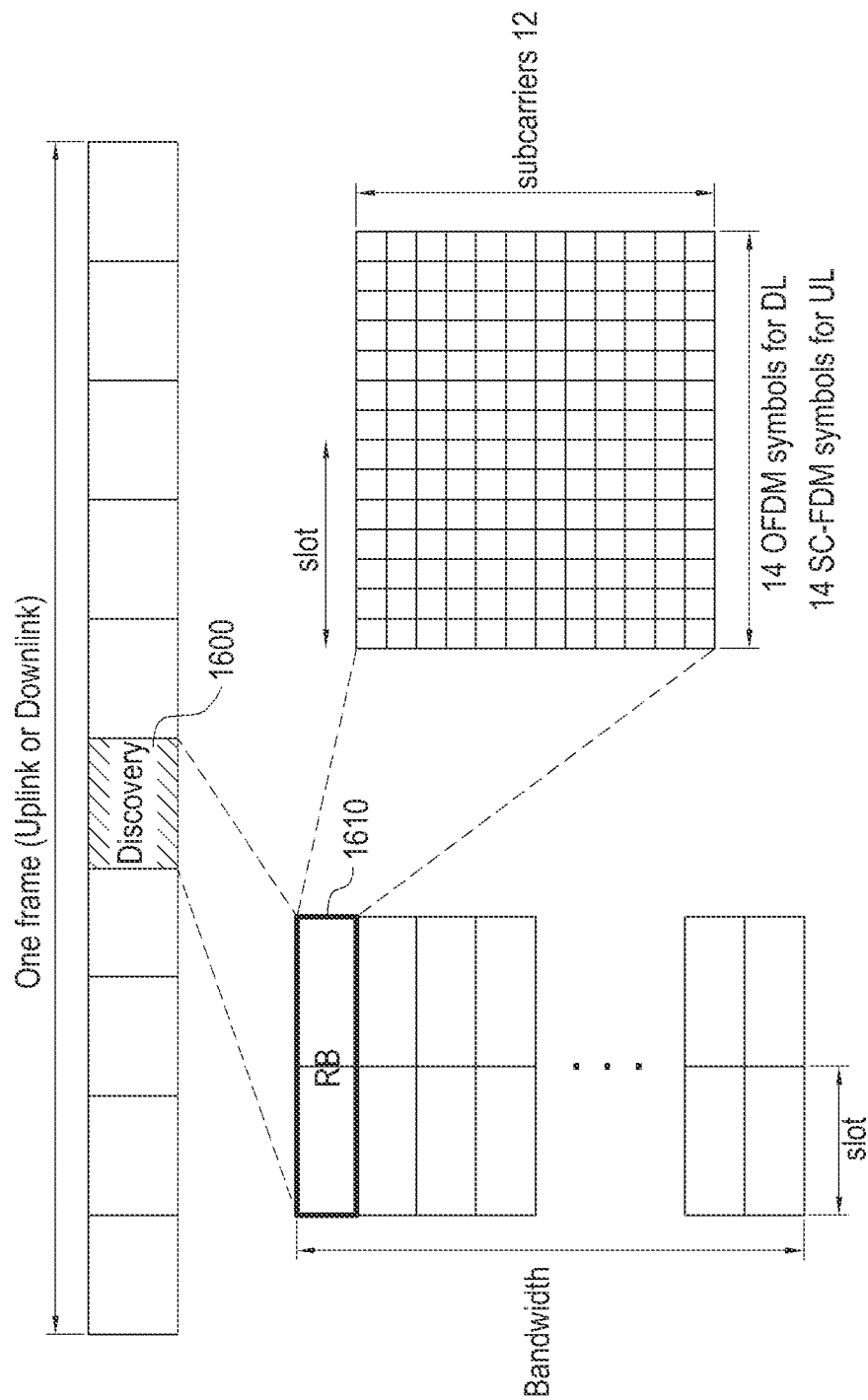
FIG. 16 illustrates an example of a greedy approach in which each device selects the resources for transmitting its own discovery information in a distributed way in a static allocation method which is to be compared with the present disclosure.

FIG. 16 illustrates an example of greedy approach in which each device selects in a distributed way the resources for transmitting its own discovery information in a static allocation method which is to be compared with embodiments of the present disclosure.

Referring to FIG. 16, if a D2D device determines which subframe(s) is a discovery subframe(s) 1600 in a frame, based on the SIB information, each D2D device should receive the discovery subframe(s) 1600 for a predetermined time. After completion of the reception, each D2D device should transmit a discovery signal. To this end, each D2D device may measure and classify energy of an RB constituting the received discovery subframe. After the classification, each D2D device may transmit discovery information in the RB having an energy level of the bottom x % (e.g., 5%). The structure of an RB 1610, in which discovery information is transmitted, may have 12 subcarriers in the frequency axis and 14 symbols in the time axis. The RB 1610 may have 14 OFDM symbols in the case of OFDM, and 14 SC-FDMA symbols in the case of SC-FDMA. If there is a change in congestion, load balancing, priority handling or discovery information, the static allocation-based greedy approach may not efficiently handle the change.

The method and system according to embodiments of the present disclosure may be implemented as a computer-readable code in a computer-readable recording medium. The computer-readable recording medium may include any kind of recording device storing the data that can be read by the computer system. Examples of the recording medium may include Read Only Memory (ROM), Random Access Memory (RAM), Compact Disk Read Only Memory (CD-ROM), magnetic tape, floppy disk, optical data storage, and the like, and may also include carrier waves which are transmitted over the Internet.

As is apparent from the foregoing description, embodiments of the present disclosure may minimize the increase in overhead during resource allocation.

Embodiments of the present disclosure may efficiently control a priority of RB selection if there is a priority in D2D communication.

Embodiments of the present disclosure may allocate resources so that devices may efficiently use the resources.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for requesting resource allocation by a device-to-device (D2D) communication device (D2D device) in a wireless network supporting a D2D communication, the method comprising:

receiving, by the D2D device from a base station, resource pool information including information about one or more resource blocks (RBs) for the D2D communication;

scanning, by the D2D device, an energy level of the one or more RBs included in the resource pool information, the scanned energy level including energy levels of signals received from the one or more RBs;

determining, by the D2D device, to transmit a request for a dynamic resource allocation to the base station, based on whether a result of the scanning of the energy level of the one or more RBs meets a condition for switching a type of resource allocation method to the dynamic resource allocation;

transmitting, by the D2D device to the base station, the request for the dynamic resource allocation; and receiving, by the D2D device from the base station, a command which instructs the D2D device to stay awake for receiving discovery information from another D2D device, wherein the command is determined based on a difference between a first time that the base station performs dynamic resource allocation and a second time that the D2D device receives a physical downlink control channel (PDCCH).

2. The method of claim 1, wherein the condition for switching the type of resource allocation method to the dynamic resource allocation comprises at least one of:

a first case where energy levels of all of the one or more RBs are higher than a specific threshold, a second case where none of the one or more RBs has an energy level lower than the specific threshold, a third case where an RB having an energy level lower than the specific threshold exists among the one or more RBs, but a margin between the energy level of the RB having the energy level lower than the specific threshold and the specific threshold is less than a predetermined amount, or a fourth case where a number of RBs having an energy level lower than the specific threshold among the one or more RBs is less than or equal to a specific number.

3. The method of claim 1, wherein the condition for switching the type of resource allocation method to the dynamic resource allocation comprises a case where energy levels of all of the one or more RBs are higher than a specific threshold in a process, and the D2D device has a priority greater than or equal to a specific value.

4. The method of claim 1, wherein the condition for switching the type of resource allocation method to the dynamic resource allocation comprises a case where the D2D device that has a priority greater than or equal to a specific value requires the resource allocation due to a change in an amount of information for the D2D device to transmit.

5. The method of claim 1, wherein the request for the dynamic resource allocation comprises a request for D2D resources used by the D2D device based on a payload size of the D2D device.

6. The method of claim 1, wherein the command is received by the D2D device if the difference is less than or equal to a predetermined threshold.

7. The method of claim 1, wherein the request includes indexes of RBs selected by the D2D device.

8. A method for performing resource allocation by a base station in a wireless network supporting a device-to-device (D2D) communication, the method comprising:

generating, by the base station, resource pool information about one or more resource blocks (RBs) for the D2D communication;

transmitting, by the base station to a D2D device, the resource pool information;

receiving, by the base station from the D2D device, a request for a dynamic resource allocation; and transmitting, by the base station to the D2D device, a command which instructs the D2D device to stay awake for receiving discovery information from another D2D device, wherein the D2D device determines to transmit the request for the dynamic resource allocation to the base station, based on whether a result of the D2D device scanning an energy level of the one or more RBs included in the resource pool information meets a condition for switching a type of resource allocation method to the dynamic resource allocation, wherein the scanned energy level including energy levels of signals received from the one or more RBs, and wherein the command is determined based on a difference between a first time that the base station performs dynamic resource allocation and a second time that the D2D device receives a physical downlink control channel (PDCCH).

9. The method of claim 8, wherein the condition for switching the type of resource allocation method to the dynamic resource allocation at least one of:

a first case where energy levels of all of the one or more RBs are higher than a specific threshold, a second case where none of the one or more RBs has an energy level lower than the specific threshold, a third case where an RB having an energy level lower than the specific threshold exists among the one or more RBs, but a margin between the energy level of the RB having the energy level lower than the specific threshold and the specific threshold is less than a predetermined amount, or a fourth case where a number of RBs having an energy level lower than the specific threshold among the one or more RBs is less than or equal to a specific number.

10. The method of claim 8, wherein the condition for switching the type of resource allocation method to the dynamic resource allocation comprises a case where the energy levels of all of the one or more RBs are higher than a specific threshold in a process, and the D2D device has a priority greater than or equal to a specific value.

11. The method of claim 8, wherein the condition for switching the type of resource allocation method to the dynamic resource allocation comprises a case where the D2D device that has a priority greater than or equal to a specific value requires the resource allocation due to a change in an amount of information for the D2D device to transmit.

12. The method of claim 8, wherein the request for the dynamic resource allocation comprises a request for D2D resources used by the D2D device based on a payload size of the D2D device.

13. The method of claim 8, wherein the command is transmitted if the difference is less than or equal to a predetermined threshold.

14. The method of claim 8, wherein the request includes indexes of RBs selected by the D2D device.

15. A device-to-device (D2D) communication device (D2D device) in a wireless network supporting a D2D communication, the D2D device comprising:

a transceiver; and at least one processor configured to:
control the transceiver to receive, from a base station, resource pool information including information about one or more resource blocks (RBs) for the D2D communication,
scan an energy level of the one or more RBs included in the resource pool information, the scanned energy level including energy levels of signals received from the one or more RBs,
determine to transmit a request for a dynamic resource allocation to the base station, based on whether a result of the scanning the energy level of the one or more RBs meets a condition for switching a type of resource allocation method to the dynamic resource allocation,
control the transceiver to transmit the request for the dynamic resource allocation to the base station, and
control the transceiver to receive, from the base station, a command which instructs the D2D device to stay awake for receiving discovery information from another D2D device,
wherein the command is determined based on a difference between a first time that the base station performs dynamic resource allocation and a second time that the D2D device receives a physical downlink control channel (PDCCH).

16. The D2D device of claim 15, wherein the condition for switching the type of resource allocation method to the dynamic resource allocation comprises at least one of:
a first case where energy levels of all of the one or more RBs are higher than a specific threshold,
a second case where none of the one or more RBs has an energy level lower than the specific threshold,
a third case where an RB having an energy level lower than the specific threshold exists among the one or more RBs, but a margin between the energy level of the RB having the energy level lower than the specific threshold and the specific threshold is less than a predetermined amount, or
a fourth case where a number of RBs having an energy level lower than the specific threshold among the one or more RBs is less than or equal to a specific number.

17. The D2D device of claim 15, wherein the condition for switching the type of resource allocation method to the dynamic resource allocation comprises a case where energy levels of all of the one or more RBs are higher than a specific threshold in a process, and the D2D device has a priority greater than or equal to a specific value.

18. The D2D device of claim 15, wherein the condition for switching the type of resource allocation method to the dynamic resource allocation comprises a case where the D2D device that has a priority greater than or equal to a specific value requires the resource allocation due to a change in an amount of information for the D2D device to transmit.

19. The D2D device of claim 15, wherein the request for the dynamic resource allocation comprises a request for D2D resources used by the D2D device based on a payload size of the D2D device.

20. The D2D device of claim 15, wherein the command is received if the difference is less than or equal to a predetermined threshold.

21. The D2D device of claim 15, wherein the request includes indexes of RBs selected by the D2D device.

22. An apparatus configured to perform resource allocation by a base station in a wireless network supporting a device-to-device (D2D) communication, the apparatus comprising:
a transceiver; and
at least one processor configured to:
generate resource pool information about one or more resource blocks (RBs) for the D2D communication,
control the transceiver to transmit the resource pool information to a D2D device,
control the transceiver to receive a request for a dynamic resource allocation from the D2D device, and
control the transceiver to transmit, to the D2D device, a command which instructs the D2D device to stay awake for receiving discovery information from another D2D device,
wherein the D2D device determines to transmit the request for the dynamic resource allocation to the base station, based on whether a result of the D2D device scanning an energy level of the one or more RBs included in the resource pool information meets a condition for switching a type of resource allocation method to the dynamic resource allocation,
wherein the scanned energy level including energy levels of signals received from the one or more RBs, and
wherein the command is determined based on a difference between a first time that the base station performs dynamic resource allocation and a second time that the D2D device receives a physical downlink control channel (PDCCH).

23. The apparatus of claim 22, wherein the condition for switching the type of resource allocation method to the dynamic resource allocation comprises at least one of:
a first case where energy levels of all of the one or more RBs are higher than a specific threshold,
a second case where none of the RBs has an energy level lower than the specific threshold,
a third case where an RB having an energy level lower than the specific threshold exists among the one or more RBs, but a margin between the energy level of the RB having the energy level lower than the specific threshold and the specific threshold is less than a predetermined amount, or
a fourth case where a number of RBs having an energy level lower than the specific threshold among the one or more RBs is less than or equal to a specific number.

24. The apparatus of claim 22, wherein condition for switching the type of resource allocation method to the dynamic resource allocation comprises a case where energy levels of all of the one or more RBs are higher than a specific threshold in a process, and the D2D device has a priority greater than or equal to a specific value.

25. The apparatus of claim 22, wherein the condition for switching the type of resource allocation method to the dynamic resource allocation comprises a case where the D2D device that has a priority greater than or equal to a specific value requires the resource allocation due to a change in an amount of information for the D2D device to transmit.

26. The apparatus of claim 22, wherein the request for the dynamic resource allocation comprises a request for D2D resources used by the D2D device based on a payload size of the D2D device.

27. The apparatus of claim 22, wherein the command is transmitted if the difference is less than or equal to a predetermined threshold.

28. The apparatus of claim 22, wherein the request includes indexes of RBs selected by the D2D device.

* * * * *